United States Patent [19]

Lutz

[11] 4,344,800

[45] Aug. 17, 1982

[54] METHOD FOR PRODUCING HYDROPHOBIC REINFORCING SILICA FILLERS AND FILLERS OBTAINED THEREBY

[75] Inventor: Michael A. Lutz, Midland, Mich.

[73] Assignee: Dow Corning Corporation, Midland, Mich.

[21] Appl. No.: 156,002

[22] Filed: Jun. 3, 1980

[51] Int. Cl.$^3$ .................. C04B 31/40; C09C 1/28; C09C 3/12

[52] U.S. Cl. .................. 106/308 Q; 106/288 B; 106/308 N; 106/309; 252/452

[58] Field of Search .......... 106/308 Q, 308 N, 288 B, 106/309; 252/452

[56] References Cited

U.S. PATENT DOCUMENTS

| | | | |
|---|---|---|---|
| 3,024,124 | 3/1962 | Brown | 106/308 |
| 3,677,784 | 7/1972 | Nitzsche et al. | 106/308 Q |
| 3,850,971 | 11/1974 | Termin et al. | 260/448.8 R |
| 4,006,175 | 2/1977 | Termin et al. | 252/451 X |
| 4,208,316 | 6/1980 | Nauroth et al. | 106/308 Q |

*Primary Examiner*—Carl F. Dees
*Attorney, Agent, or Firm*—Richard E. Rakoczy

[57] ABSTRACT

Hydrophobic reinforcing silica fillers for silicone rubber are produced by the steps of mixing an alkyl silicate, preferably methyl orthosilicate, at least 70% of one-half of the stoichiometric amount of water required to hydrolyze the alkoxy radicals present in the alkyl silicate, an alcohol and at least 0.05 moles (per mole of theoretical $SiO_2$ units present in the alkyl silicate) of a hydrophobe agent such as hexamethyldisilazane together in the presence of a basic catalyst, said hydrophobe agent being added prior to the gelation of the mixture, and aging the mixture to obtain a composition containing a hydrophobic reinforcing silica filler for silicone rubber. Preferably, the hydrophobe agent is added prior to or concurrently with the addition of the alkyl silicate. Vulcanized silicone rubbers possessing tensile strengths in excess of 12.4 megapascals and tear strengths of greater than 31 kiloNewtons/meter can be prepared using the above fillers.

84 Claims, No Drawings

METHOD FOR PRODUCING HYDROPHOBIC REINFORCING SILICA FILLERS AND FILLERS OBTAINED THEREBY

BACKGROUND OF THE INVENTION

1. Field of the Invention

This invention relates to a method for the preparation of hydrophobic reinforcing silica fillers for silicone rubber and to the fillers produced in accordance with said method.

Description of the Prior Art

Silicone rubbers formed from the vulcanization of polydiorganosiloxane gums alone generally have low ultimate elongation and tensile strength values. One means for improving the physical properties of silicone rubbers involves incorporation of a reinforcing silica filler into the gum prior to vulcanization. However, reinforcing silica fillers have a tendency to interact with the polydiorganosiloxane gum and this results in a phenomenon known as "crepe hardening." A great deal of effort has been made in the past to treat the surface of reinforcing silica fillers with organosilanes or organosiloxanes to render the surface of the silica hydrophobic. This surface treatment reduces or eliminates the tendency of the compositions to crepe harden while improving the physical properties of the vulcanized silicone rubber.

Brown, in U.S. Pat. No. 3,024,126, teaches a method for rendering a pre-formed reinforcing silica filler hydrophobic by treating it in an organic solvent with an organosilicon compound, such as an organosilane or low molecular weight organosiloxane containing 0.1 to 2 total hydroxyl and/or alkoxy radicals per silicon atom, and a small amount of a certain amine, quaternary ammonium or organometallic compound. Lewis, in U.S. Pat. No. 3,979,546, teaches a method for rendering the surfaces of reinforcing agents such as siliceous fillers hydrophobic through the use of alpha-alkoxy-omega-siloxanols prepared by the reaction of cyclic siloxanes with alcohols under mild conditions. The fillers taught are pre-formed solids. However, these methods require that the reinforcing silica filler be manufactured first and then surface-treated in the form of a powder or gel.

Tyler, in U.S. Pat. No. 3,015,645 teaches the production of hydrophobic silica powders by reacting an organosilicon compound such as dimethyldichlorosilane or trimethylmethoxysilane with an organogel in the presence of an acidic catalyst and then removing the volatile materials. This requires the preparation of a hydrogel which is converted to an organogel by replacing the water in the hydrogel with an organic solvent. Lentz, in U.S. Pat. No. 3,122,520, teaches a procedure wherein an acidic silica hydrosol is first heated to develop a reinforcing silica structure and then mixed with an organosilicon compound, such as the ones taught in Tyler above, an acidic catalyst and a water-immiscible organic solvent to produce a hydrophobic silica filler.

In U.K. Patent Application No. GB 2,001,303A, a hydrophobized precipitated silica is prepared by precipitating waterglass in a weakly alkaline aqueous medium. After precipitation of the silica, an alkaline pH is maintained while an organosilicon hydrophobing compound of the general formula $(Y'_3Si)_aZ'$ is added to the medium containing the silica. Y' is a monofunctional hydrocarbon radical, Z' is —OH, —OY, or —NYX, among others, and X is hydrogen or Y'. The three preceding processes have the disadvantage of having to deal with the disposal of salt-containing solutions formed when the silica is precipitated and require the formation of a structured silica product prior to the hydrophobization step.

One attempt to eliminate the separate hydrophobization step is found in British Pat. No. 1,062,599 wherein a hydrophobic silica is prepared by precipitating silica from an aqueous waterglass solution in the presence of an organohalosilane. The precipitation is conducted under acidic conditions. This process still produces a water solution containing salts as a by-product.

In U.S. Pat. No. 3,850,971 entitled "Porous Silicic Acid and Its Production", Termin et al. describe a process for producing porous silicic acid which is free of ions or salts through the hydrolysis of silicic acid esters in the presence of 70 to 120% of the stoichiometrically required amount of water with moderate stirring using a particular type of stirring apparatus as detailed in the specification. Up to 100% alcohol by volume, relative to the amount of silicic ester or polyalkyl silicate, can be added to facilitate homogeneous mixing of the silicic acid ester, preferably tetramethyl silicate, and water. A preferred method involves the use of 0.1 to 2 mole percent, relative to the amount of silicic ester or polyalkyl silicate, of a hydrolysis activator such as acidic or basic substances. Example 19 employs approximately twice the suggested maximum amount of hydrolysis activator (ammonia), but no reason is given for this deviation. Hydrolysis activators such as compounds containing silicon or transition metals are preferred because they act as activators, enter into the product without causing undesirable contamination and can influence the silicic acid product relative to wettability. Silyl amines and silyl azanes are suggested in U.S. Pat. No. 3,850,971 as being some of the suitable basic substances and trimethoxy-gamma-amino-propyl silane is suggested as being useful to influence the water repellency of the product. Many possible uses for the silicic acid gels formed are mentioned such as fillers for paper, rubber, plastics, filter aids and in chromatography. U.S. Pat. No. 4,006,175 is a division of the above patent to Termin et al. and involves a process for producing porous silicic acids containing oxides of transition metals.

However, the Termin et al. patents only teach the use of silicon compounds which are either basic or which liberate basic substances as hydrolysis activators and does not suggest the use of a sufficient amount of such compounds to render the silicic acid product or silica filler sufficiently hydrophobic to be useful as a hydrophobic reinforcing silica filler for silicone rubber. The Termin et al. patents do not suggest that basic substances such as ammonia can be used in combination with a sufficient amount of a silicon compound which would not be considered either to be a basic substance or to be a substance which would liberate a basic substance such as dimethyldimethoxysilane to produce a hydrophobic reinforcing silica filler for silicone rubber by the process hereinafter described. Furthermore, the Termin et al. process appears to require a particular type of stirring apparatus. Furthermore, the patent does not suggest that amounts of water in excess of 120% of the stoichiometric amount are desirable in producing the fillers described therein and furthermore does not suggest that amounts of water greater than 120% can be used to produce hydrophobic reinforcing silica fillers for silicone rubber.

In U.S. Pat. No. 4,017,528 entitled "Preparation of Organically Modified Silicon Dioxides," Unger et al. teach the preparation of modified, porous silicon dioxides by the hydrolytic polycondensation of tetraalkoxysilanes or polyalkoxysiloxanes in the heterogeneous phase in the presence of an organoalkoxysilane. One embodiment of the process (Method 2) involves mixing a polyalkoxysiloxane (or alkyl polysilicate) having an average molecular weight of 750 to 2800 with an organoalkoxysilane (preferably $A_nSi(OB)_{4-n}$ where A is an alkyl, aryl or aralkyl group, B is an alkyl group of 1–4 carbon atoms and n is an integer 1, 2 or 3, preferably 1), introducing this mixture into a mixture of a large excess of water and a water-miscible solvent, such as methanol or ethanol, to form a heterogeneous mixture, dispersing the heterogeneous mixture by agitation or shaking (the Examples describe the process as one whereby the solutions are "emulsified") and then adding a basic catalyst to the dispersion. Upon addition of the catalyst, hydrolytic polycondensation is said to occur and allegedly produces spherical particles of organosilicon dioxide gel which are useful as chromatographic adsorbents. The patent teaches that hydrophobicity of the organosilicon dioxide gel can be altered by the choice of organic group present in the organoalkoxysilane used in the process. The process described in the Unger et al. patent is also noted in an article by Unger et al. entitled "Recent Developments in the Evaluation of Chemically Bonded Silica Packings for Liquid Chromatography," Journal of Chromatography, Vol. 125, pp. 115–127, Elsevier Scientific Publishing Company, Amsterdam (1976). This article deals with the use of surface modified silicon dioxides as chromatographic adsorbents and one method for preparing such modified silicon dioxide appears to be the method described in the Unger et al. patent.

However, the Unger et al. patent is directed towards the preparation of organosilicon dioxide gels useful in chromatographic applications and does not suggest that the allegedly spherical products produced by the hydrolytic condensation in the heterogeneous phase will possess the degree of hydrophobicity and the type of structure required to enable the products to be useful as a hydrophobic reinforcing silica filler for silicone rubber. Furthermore, the Unger et al. patent teaches that the preferred organoalkoxysilanes are those where n has a value of 1, but for purposes of rendering silica fillers hydrophobic, n preferably has a value of 2 or 3.

From the foregoing discussion, it is apparent that there is a need for a simple procedure for preparing a silica filler possessing both the requisite amount of hydrophobicity and the necessary structure to be useful as a hydrophobic reinforcing silica filler for silicone rubber. Such a process should avoid the necessity for producing a silica filler with a structure suitable for use as a reinforcing filler in silicone rubber prior to the hydrophobization step. Such a process should also be one which does not produce by-products such as salts which would contaminate the silica filler and pose disposal problems. A novel process for obtaining such fillers will now be described.

SUMMARY OF THE INVENTION

A primary object of the present invention is to provide a method for producing a hydrophobic reinforcing silica filler for silicone rubber by the alkaline hydrolysis and condensation of an alkyl silicate in the presence of an alcohol wherein the silica obtained has the necessary structure required to reinforce silicone rubber and such silica is rendered hydrophobic by the incorporation of a hydrophobe agent prior to gelation of the mixture. The silica-containing composition is then aged for a sufficient amount of time to allow the silica product to become suitably hydrophobic. The above method is especially suitable for use in a continuous manufacturing operation.

It is another object of the present invention to provide a fluid product containing the above-described filler which is easily pumped and which can be directly incorporated into a polyorganosiloxane gum in its fluid state.

It is still another object of the present invention to provide a method for producing a highly reinforcing silica filler for silicone rubber which results in vulcanized silicone rubbers which exhibit tensile strengths in excess of about 12.4 megapascals (MPa) (1800 p.s.i.).

It is still another object of the present invention to provide a method for producing a hydrophobic reinforcing silica filler which does not require a separate hydrophobization step. This method can also provide compositions containing such fillers which are free of undesirable by-products such as salts.

DETAILED DESCRIPTION OF THE INVENTION

This invention relates to a method for the production of a composition containing a hydrophobic reinforcing silica filler for silicone rubber which comprises the steps of (I) mixing the following in the presence of a sufficient amount of at least one basic catalyst to render the mixture alkaline:
 (A) at least one alkyl silicate selected from the group consisting of methyl orthosilicate, ethyl orthosilicate, methyl polysilicate and ethyl polysilicate, wherein said alkyl silicate contains alkoxy radicals,
 (B) an amount of water equal to at least 70 percent of one-half of the stoichiometric amount of water required to completely hydrolyze the alkoxy radicals present in said alkyl silicate,
 (C) at least one alcohol selected from the group consisting of methanol, ethanol, n-propanol, and isopropanol, and
 (D) at least one hydrophobe agent selected from the group consisting of $R_nSiZ_{4-n}$, $(R_3Si)_2NH$, $(R_3Si)_2O$, $(R_2SiO)_x$, $(R_2SiNH)_x$, $R'O(R_2SiO)_yR'$, $(R_3Si)_2NR''$ and $(R_2SiNR'')_x$ wherein each R is selected from the group consisting of aliphatic hydrocarbon radicals of from 1 to 6 inclusive carbon atoms, halogenated alkyl radicals of 1 to 10 inclusive carbon atoms and phenyl radicals, each R' is hydrogen or R'', each R'' is an alkyl radical of 1 to 4 inclusive carbon atoms, each Z is —OR', —NHR'', or —NR$_2$'', n has an average value of from 2 to 3 inclusive, x has an average value of from 3 to 6 inclusive, y has an average value of from 1 to 12 inclusive, the amount of said hydrophobe agent present being sufficient to provide at least 0.05 moles of hydrophobe agent per mole of theoretical $SiO_2$ units present in said alkyl silicate, wherein there is a sufficient amount of (A) present to provide at least 3 parts by weight of theoretical $SiO_2$ units per 100 parts by weight of of (A), (B), (C) and any basic catalyst not derived from (D) and wherein the order of mixing is such that (D) is added prior to the occurrence of any gelation of the composition formed upon mixing, and (II) aging the mixture formed in (I) for a sufficient amount of time to result in a composition containing a hydrophobic reinforcing silica filler for silicone rubber.

This invention also relates to the dry hydrophobic reinforcing silica filler for silicone rubber itself and to compositions containing such fillers obtained in accordance with the above-described method.

The present invention involves a process for preparing a particular type of silica filler by the hydrolysis of alkyl silicates such as methyl orthosilicate, $Si(OCH_3)_4$, and ethyl orthosilicate, $Si(OC_2H_5)_4$. For purposes of the present invention, the term "alkyl silicate" also includes alkyl polysilicates such as methyl polysilicate, $(CH_3O)_3Si\{OSi(OCH_3)_2\}_p(OCH_3)$, and ethyl polysilicate $(C_2H_5O)_3Si\{OSi(OC_2H_5)_2\}_q(OC_2H_5)$, where the average value of p and q, respectively, is one or more, the actual value being determined by the average molecular weight of the alkyl polysilicate. When p or q has a value of 0, the corresponding alkyl orthosilicate is obtained. Lower molecular weight alkyl polysilicates are commercially available from Dynamit Nobel Chemicals, D-5210 Troisdorf-Oberlar, West Germany under the tradename of "Dynasil" and alkyl polysilicates having higher molecular average weights (1000-3000) can be prepared by well-known techniques such as acidic polycondensation of alkyl silicates in the presence of less than a stoichiometric amount of water. Mixtures of different alkyl silicates can also be used.

The preferred alkyl silicate is methyl orthosilicate due to the lower molecular weight alcohol generated upon hydrolysis and to its rapid rate of hydrolysis when compared to ethyl orthosilicate. Higher product yields are therefore possible although in some applications the use of the latter may be preferred due to the lower toxicity of ethyl orthosilicate. When alkyl polysilicates are used, it can be preferable to use alkyl polysilicates of less than 1000 molecular weight to avoid the production of silica fillers which do not possess the necessary structure to act as reinforcing fillers.

The hydrolysis and condensation of alkyl silicates is known to proceed according to the following general equation

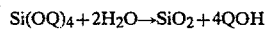

$$Si(OQ)_4 + 2H_2O \rightarrow SiO_2 + 4QOH$$

where Q is a methyl radical (—OQ is a methoxy radical) in the case of methyl orthosilicate or methyl polysilicate and Q is an ethyl radical (—OQ is an ethoxy radical) in the case of ethyl orthosilicate or ethyl polysilicate. Therefore in the total reaction, one-half mole of water per alkoxy or —OQ group in the alkyl silicate (100% of one-half of the theoretical or stoichiometric amount) is required to hydrolyze the alkyl silicate to form a hydrolyzed adduct which then condenses into the corresponding theoretical $SiO_2$ or silicon dioxide units. As is well known, the actual structure of the silica filler is not entirely made up of $SiO_2$ units because some of the silicon atoms have hydroxyl and alkoxy radicals remaining after the hydrolysis and condensation reaction is completed. The actual amount of hydroxyl and alkoxy radicals remaining in the product is dependent upon several variables such as the amount of water, alcohol and/or catalyst initially present and also upon the theoretical $SiO_2$ content of the hydrolysis mixture. For this reason, about 70% of one-half of the theoretical or stoichiometric amount of water necessary to completely hydrolyze the alkoxy groups on the alkyl silicate is the minimum amount that can be used to produce silica fillers according to the present invention. It can be preferable to use approximately 100% of one-half of the stoichiometric amount of water because the resulting silica filler-containing compositions are substantially free of water and as a result, there is one less compartment to be separated during the re-cycling of the products left after the filler is removed. However, satisfactory hydrophobic reinforcing silica fillers can also be produced by the method of the present invention when greater than 120% of one-half of the stoichiometric amount of water is present in the mixture. For the purposes of calculating and describing the amount of each ingredient, it will be assumed that all of the alkyl silicate will be converted into silicon dioxide or theoretical $SiO_2$ units upon hydrolysis and condensation. The upper limit of water cannot be specified without taking into consideration the theoretical $SiO_2$ content and also the amount of alcohol and catalyst present initially. This dependency will be discussed infra. When hydrophobe agents such as hexamethyldisilazane or dimethyldimethoxysilane are used, the amount of water required to hydrolyze such hydrophobe agents to form species which are belived to be those such as $(CH_3)_3SiOH$ which are then capable of reacting with and rendering the silica filler hydrophobic must also be included in calculating the amount of water which must be present initially. Such hydrolysis also generates basic catalyst when hydrophobe agents such as hexamethyldisilazane are employed.

Water-miscible alcohols such as methanol, ethanol, n-propanol, isopropanol or mixtures thereof are useful in rendering the alkyl silicate soluble in the mixture and therefore enables a silica filler of the required structure to rapidly be formed. The type of alcohol chosen affects the rate of hydrolysis and condensation of the alkyl silicate. Methanol is the preferred alcohol. The amount of alcohol initially added is dependent upon the amount of alcohol generated by the hydrolysis of the alkyl silicate chosen and the amount of water and catalyst initially added. In general, it is preferred that at least 50 percent by weight of the total amount of alcohol (the sum of the alcohol added and that generated by hydrolysis and water present in the mixture be alcohol.

Hydrophobe agents useful in the process which comprises the present invention are organosilanes, organosilazanes, low molecular weight diorganopolysiloxanes and diorganopolysilazanes which will not render the reaction mixture acidic. Suitable hydrophobe agents can be those possessing the average formula $R_nSiZ_{4-n}$, $(R_3Si)_2NH$, $(R_3Si)_2O$, $(R_2SiO)_x$, $(R_2SiNH)_x$, $R'O(R_2SiO)_yR'$, $(R_3Si)_2NR''$ and $(R_2SiNR'')_x$. Each R can be an aliphatic hydrocarbon radical of 1 to 6 inclusive carbon atoms such as methyl, ethyl, vinyl, allyl, propyl, butyl, isobutyl and hexyl, a halogenated alkyl radical of 1 to 10 inclusive carbon atoms, such as 3,3,3-trifluoropropyl, bromodecyl, 3-chloropropyl radicals, fluoroalkyl radicals of the formula $C_tF_{2t+1}CH_2CH_2$ where t has a value of from 1 to 8 inclusive such as $C_3F_7CH_2CH_2$, $C_7F_{15}CH_2CH_2$ and $C_8F_{17}CH_2CH_2$, or a phenyl radical. R' can be hydrogen or R''. R'' can be an alkyl radical of 1 to 4 inclusive carbon atoms such as methyl, ethyl, propyl, isopropyl, butyl or isobutyl. Each Z can be —OH, —OR such as methoxy or butoxy, —NHR'' such as —NHCH$_3$ or —NHCH$_2$CH$_3$, or —NR''$_2$ such as —N(CH$_3$)$_2$ or —N(C$_2$H$_5$)$_2$. The average value of n is from 2 to 3 inclusive. The average value of x is from 3 to 6 inclusive and the average value of y is from 1 to 12 inclusive.

Examples of suitable hydrophobe agent compounds are organosilanes such as dimethyldimethoxysilane, methylethyldimethoxysilane, methylvinyldimethoxysilane, 3,3,3-trifluoropropylmethyldimethoxysilane, trimethylmethoxysilane, trimethylsilanol, dimethylphenylmethoxysilane, dimethylpropylmethoxysilane, dimethylphenylpropoxysilane, $(CH_3)_3SiNHCH_3$, $(CH_3)_2$-$Si(NHCH_3)_2$, $(CH_3)_3SiN(CH_3)_2$, hexamethyldisilazane, sym-tetramethyldivinyldisilazane, sym-tetramethyl-bis-3,3,3-trifluoropropyldisilazane, sym-tetramethyldiphenyldisilazane, sym-tetramethyldivinyldisiloxane, and hexamethyldisiloxane; cyclic polyorganosiloxanes such as 1,3,5-trimethyl-1,3,5-trivinylcyclotrisiloxane, octamethylcyclotetrasiloxane, hexamethylcyclotrisiloxane, 1,3,5-trimethyl-1,3,5-tris(3,3,3-trifluoropropyl)-cyclotrisiloxane, hexamethylcyclotrisilazane and octamethylcyclotetrasilazane and linear polydiorganosiloxanes such as a mixture of methoxy-endblocked polydimethylsiloxanes of the average general formula $CH_3O\{(CH_3)_2SiO\}_yCH_3$ where y has an average value of from 5-7 wherein the mixture is formed by adding a basic catalyst to a methanol solution of hexamethylcyclotrisiloxane, and linear polydimethylsiloxanes such as $HO\{(CH_3)_2SiO\}_yOH$. Mixtures of different hydrophobe agents can also be used. Preferred hydrophobe agents are those possessing the average formula such as $\{(CH_3)_3Si\}_2NH$, $(CH_3)RSi(OCH_3)_2$, $\{(CH_3)RSiO\}_x$, dimethyldimethoxysilane, methylvinyldimethoxysilane, hexamethylcyclotrisiloxane, 1,3,5-trimethyl-1,3,5-trivinylcyclotrisiloxane, and $R'O\{(CH_3)(R)SiO\}_yR'$ and in the case of fillers for fluorosilicone rubber, those possessing the average formula $\{(CF_3CH_2CH_2)\text{-}(CH_3)_2Si\}_2NH$ or sym-tetramethyl-bis(3,3,3-trifluoropropyl)-disilazane, $\{(CF_3CH_2CH_2)CH_3SiO\}_x$ or 1,3,5-trimethyl-1,3,5-tris-(3,3,3-trifluoropropyl)cyclotrisiloxane and $R'O\{(CF_3CH_2CH_2)\text{-}(CH_3)SiO\}_yR'$ where R is a methyl radical or vinyl radical. However, it is possible to use fillers which do not contain fluorinated hydrophobe agents (e.g., fillers rendered hydrophobic with hexamethyldisilazane) in fluorosilicone rubbers if the filler and gum are compatible.

Basic catalysts which are suitable for use in the present invention are those compounds which are capable of rendering the mixture alkaline. Examples of such catalysts are inorganic compounds such as ammonia, ammonium hydroxide, ammonium carbonate, sodium hydroxide, and lithium hydroxide; organic compounds such as amines such as ethylamine, dimethylamine, diethylamine, triethylamine, and N,N-dimethylethanolamine; or alkali salts of carboxylic acids such as sodium acetate, ammonium acetate and sodium formate. Also useful as suitable basic catalysts are the organosilazane compounds suggested above as being useful as hydrophobe agents. Thus, a sufficient amount of a compound such as hexamethyldisilazane can serve as both a catalyst and as a hydrophobe agent. When using an organosilazane compound as the sole source of basic catalyst, it is preferable to add the organosilazane concurrent with or prior to the addition of the alkyl silicate to the rest of the components of the mixture. When mixtures of an organosilazane and a basic catalyst are used, the organosilazane can be added at any time prior to the gelation of the silica-containing composition. It is preferable to use volatile basic compounds such as ammonia, ammonium hydroxide, and/or compounds which generate volatile bases such as hexamethyldisilazane to avoid introducing undesirable ionic salts into the silica-containing composition. Strong bases such as sodium hydroxide can affect the structure of the silica and render the silica filler non-reinforcing. It is believed that the presence of alcohol retards this effect, but it is preferable to avoid the use of large amounts of such strongly basic compounds. There should be a sufficient amount of at least one basic catalyst present to result in a silica-containing composition with a pH of greater than 7. Typically, the pH is in the range of about 9 to 12.5.

For the purposes of the present invention, a silica filler prepared by the above method is required to be "hydrophobic." The meaning of this term is well known to those skilled in the art. One simple test which can be used to determine if a filler is hydrophobic is the "water flotation test" described infra. To be considered hydrophobic according to this test, a dried filler should exhibit at least 70%, and preferably substantially 100%, hydrophobicity according to this test.

For the purposes of the present invention, a hydrophobic silica filler is considered to be a hydrophobic reinforcing silica filler for silicone rubber if the tensile strength at break of a vulcanized silicone rubber consisting of a cross-linked polydimethylsiloxane gum and the silica filler to be evaluated is at least 6.2 MPa (900 p.s.i.). Such an evaluation can be carried out by using a formulation composed of a mixture of 100 parts by weight of a dimethylvinylsiloxy-endblocked polydiorganosiloxane gum consisting essentially of 99.86 mole percent of dimethylsiloxane units and 0.14 mole percent of methylvinylsiloxane units based upon the total moles of diorganosiloxane units present (it being understood that a minor amount of other types of units such as $SiO_{4/2}$ and $CH_3SiO_{3/2}$ may be present as a result of impurities introduced during the manufacture of such a gum) which has a plasticity (4.2 gram sample) in the range of about 1.40-1.65 millimeters (55-65 mils), 60 parts by weight of the filler to be evaluated (non-volatile filler solids) and 1 part by weight of 2,5-dimethyl-2,5-di(t-butylperoxy)-hexane catalyst. This formulation is allowed to stand overnight at room temperature after mixing, re-milled on a two-roll mill to soften the stock and heat/press cured in a molding chase for 10 minutes at about 170°-175° C. The tensile strength exhibited by such cured elastomer stocks, measured according to ASTM D412, should be at least 6.2 MPa (900 p.s.i.). When fillers which have been rendered hydrophobic using fluorine-containing hydrophobe agents are to be evaluated, it is preferable to employ 45 parts of the filler solids and 100 parts of a fluorine-containing polydiorganosiloxane gum of the type designated as Gum B in Example 60, infra. These fillers are useful in a variety of well-known polyorganosiloxane polymers which can be in the form of fluids, viscous liquids or gums. Examples of various types of polydiorganosiloxanes and methods for their preparation are found in U.S. Pat. Nos. 2,490,357; 2,542,334; 2,927,907; 3,002,951; 3,161,614; 3,186,967 and 3,697,473. Another indication that a silica filler has the proper structure to be reinforcing is that it possesses a high surface area, generally a surface area of at least 200 square meters per gram in the dry state which can be determined by a nitrogen adsorption method.

In performing the method which comprises the present invention, a sufficient amount of alkyl silicate should be present to provide at least 3 parts by weight of theoretical SiO$_2$ units per 100 parts alkyl silicate, water, alcohol and basic catalyst. The theoretical SiO$_2$ content can be calculated by assuming that a "hydrolysis mixture" consisting of a product formed upon mixing the desired amounts of alkyl silicate, water and alcohol in the presence of a basic catalyst is formed. The theoretical SiO$_2$ content is calculated according to the following procedure. The theoretical weight of SiO$_2$ units present in the alkyl silicate is calculated assuming complete hydrolysis of all alkoxy groups present (although it is recognized that in some cases, not enough water will be present to do so). The weight of the "hydrolysis mixture" is defined to be the sum of the weight of the alkyl silicate(s), water, alcohol(s) and basic catalyst(s), if any, added. For the purpose of calculating the weight of the hydrolysis mixture, the weight of the hydrophobe agent is ignored. Likewise, when the basic catalyst is added in the form of a hydrophobe agent, such as an organosilazane, the weight of the hydrophobe agent and basic catalyst from this source is ignored for the purpose of calculating the weight of the hydrolysis mixture. Thus, the parts by weight of theoretical SiO$_2$ units per 100 parts by weight of hydrolysis mixture is given by the formula:

$$\frac{\text{weight of theoretical SiO}_2 \text{ units} \times 100}{\text{weight of the hydrolysis mixture}}$$

The theoretical SiO$_2$ content can also be expressed in terms of parts by weight of theoretical SiO$_2$ units per 100 parts by volume of hydrolysis mixture using the same criterion as above, but substituting volumes for the weights used in calculating the hydrolysis mixture above.

At least 3 parts by weight of theoretical SiO$_2$ units must be generated to produce a commercially feasible process while the upper limit is governed only by the theoretical maximum which is about 32 parts by weight of SiO$_2$ in the case of methyl orthosilicate, and other practical factors such as fillers properties in vulcanized silicone rubber and the heat generated upon hydrolysis. For example, when the amount of methyl orthosilicate present is greater than that needed to provide about 20 parts of theoretical SiO$_2$ units per 100 parts by weight of hydrolysis mixture, the reaction is rather exothermic and becomes increasingly difficult to control upon mixing. Hydrophobic reinforcing fillers can be prepared when there is a sufficient amount of methyl orthosilicate present to provide about 24 parts by weight of theoretical SiO$_2$ units, but the ability of the silica fillers to act as reinforcing fillers appears to decrease as the theoretical SiO$_2$ content is increased above about 20 parts by weight. It is preferable to utilize hydrolysis mixtures which contain a sufficient amount of alkyl silicate to provide a theoretical SiO$_2$ content in the range of from 3 to about 20 parts by weight per 100 parts by weight of the above hydrolysis mixture and more preferably, for reasons of commercial efficiency and to obtain optimum reinforcing ability, in the range of 8 to about 17 parts by weight of theoretical SiO$_2$ units per 100 parts by weight of hydrolysis mixture. The actual amount of silica filler obtained will be higher than the theoretical amount of SiO$_2$ units because of the presence of hydrophobe agent moieties present on the surface of the silica. The actual solids content of the hydrophobic silica filler-containing compositions produced can be in the range of about 5 to 35 percent by weight.

The amount of hydrophobe agent useful in producing silica fillers by the method of the present invention is calculated on the basis of moles of hydrophobe agent per mole of theoretical SiO$_2$ units present in the alkyl silicate and must be present in sufficient amounts to render the silica filler hydrophobic. The percent hydrophobicity should be at least 70%, and preferably substantially 100%, as measured by the water flotation test. In the case of hydrophobe agents of the average formula $(R_2SiO)_x$, $(R_2SiNH)_x$, $R_nSiZ_{4-n}$ where n has an average value of 2, $(R_2SiNR'')_x$ and $R'O(R_2SiO)_yR'$, a range of from 0.05 to 0.5 moles of hydrophobe agent per mole of theoretical SiO$_2$ units supplied by the alkyl silicate is generally sufficient. In the case of hydrophobe agents of the average formula $(R_3Si)_2NH$, $(R_3Si)_2O$, and $(R_3Si)_2NR''$ a range of about 0.08 to 0.5 moles of hydrophobe agent per mole of theoretical SiO$_2$ units is generally sufficient. In the case of hydrophobe agents of the average formula $R_nSiZ_{4-n}$ where n has an average value of 3, a range of about 0.15 to 1.0 moles of hydrophobe agent per mole of theoretical SiO$_2$ units is generally sufficient. For example, one mole of hexamethyldisilazane is considered to be one mole of hydrophobe agent for the purposes of the present invention, but it is recognized that this hydrophobe agent provides two moles of filler surface-treating (trimethylsiloxy units) moieties per mole of hexamethyldisilazane. Use of less than 0.05 moles of hydrophobe agent (0.15 in the case of hydrophobe agents of the average formula $R_nSiZ_{4-n}$ where n has an average value of 3) results in a silica filler which either does not become sufficiently hydrophobic to be useful in formulating silicone rubbers without the use of significant amounts of additional silica pacifying agents or requires a commercially unreasonable amount of time (generally more than 24 hours aging time) to exhibit at least 70%, and preferably substantially 100%, hydrophobicity according to the water flotation test. More than 0.5 moles of hydrophobe agent (1.0 moles in the case of hydrophobe agents of the average formula $R_nSiZ_{4-n}$ where n has an average value of 3) can be wasteful and can detrimentally affect the ability of the silica filler to reinforce silicone rubber. Therefore, one advantage possessed by these fillers is that the use of silica pacifying or plasticizing agents can be eliminated or greatly reduced. Use of large amounts of hydrophobe agents can result in the formation of significant amounts of low-molecular weight copolymers which are soluble in solvents such as benzene. Such copolymers do not possess the necessary structure to result in reinforcing silica fillers and results in a waste of hydrophobe agent.

There must be a minimum amount of water present to achieve a sufficient degree of hydrolysis of the alkyl silicate, but the actual amount is dependent upon the amount of alcohol and basic catalyst present. The percentage of theoretical SiO$_2$ units present in the composition is also a factor. For this reason, no critical limitations can be placed upon the amount of water, alcohol and basic catalyst other than the ones previously made. Therefore, to determine whether a particular formulation produces a hydrophobic reinforcing silica filler for silicone rubber and thereby falls within the scope of the claims of the present invention, one must evaluate the physical properties of a vulcanized silicone rubber as was outlined earlier in the specification. However, some formulation guidelines can be set forth and specific examples of various types of formulations will be given to aid others in practicing the method which comprises the present invention.

Likewise, the following theoretical discussion is intended to aid others in utilizing this method. The rate of hydrolysis and condensation of the alkyl silicate affects the structure and therefore the ability of the resulting filler to reinforce silicone rubber. It is believed that an important novel feature of the present invention is the discovery that in an alkaline medium, the hydrolysis and condensation of the alkyl silicate takes place much more quickly than does the reaction of the hydrophobe agent with alkyl silicate and/or silica product. As a result, a silica filler with the proper structure is formed and rendered hydrophobic without requiring a two-stage process involving first controlling the formation of a silica filler and then subsequently rendering it hydrophobic.

Recognizing this difference in reaction rate, the importance of rendering the alkyl silicate soluble in the hydrolysis mixture as quickly as possible becomes apparent. Alkyl silicates, especially the alkyl polysilicates, are not immediately soluble in water and it is desirable to have a sufficient amount of alcohol present initially to solubilize a portion of the alkyl silicate which can then be hydrolyzed to form more alcohol and render the remaining amount of alkyl silicate soluble in the mixture. Hydrolysis and condensation of the alkyl silicate should take place under conditions which are as homogeneous as possible to insure the formation of a silica filler possessing the proper structure. Formation of an emulsion consisting of tiny droplets of alkyl silicate in a liquid continuous phase, such as can occur when a large amount of the alcohol-water mixture is water, should be avoided. The alkyl silicate can initially appear to form a dispersion, but can later form a clear solution prior to the gelation of the solution. The hydrophobe agent chosen may also result in the formation of a cloudy dispersion, but the silica filler obtained can still exhibit the ability to reinforce silicone rubber. In this case, it is believed that the alkyl silicate was sufficiently homogeneously incorporated to result in a silica product with the desired structure.

Generally, it is desirable to have alcohol present initially to solubilize the alkyl silicate, especially when alkyl polysilicates are being used. The preferred alcohol is methanol because it appears to increase the hydrolysis and condensation rate and is readily removed due to its volatility. One guideline for calculating the ratio of alcohol to water involves determining the amount of alkyl silicate necessary to provide the desired weight of theoretical $SiO_2$ units per 100 parts by weight of hydrolysis mixture. The amount of water necessary to conduct the complete hydrolysis of one-half of the alkoxy groups present in the alkyl silicate and the amount of alcohol generated can then be calculated. The excess water in the hydrolysis mixture can then be calculated. The excess water (hereinafter EXW) is the amount of water to be added less the amount of water calculated above. However, when a hydrophobe agent such as hexamethyldisilazane is used, the amount of stoichiometric water required to hydrolyze the hydrophobe agent is also subtracted from the total amount of water added to obtain the EXW term. The total amount of alcohol in the hydrolysis mixture—the sum of the alcohol added and the alcohol generated upon hydrolysis—can then be calculated (hereinafter TAA). The percentage of excess water present in the hydrolysis mixture (hereinafter %EWM) is then $$\frac{EXW}{EXW + TAA} \times 100 = \% EWM.$$

At a particular level of theoretical $SiO_2$ units, the %EWM can be used to estimate whether or not a particular amount of water and alcohol will produce a reinforcing silica filler. The variation in rubber properties such as tensile strength as compared with %EWM will be demonstrated in Examples 22-30.

The method of the present invention can be performed in several different ways. The preferred order of mixing the components is to add the water, methanol and basic catalyst together with stirring. The hydrophobe agent is then added to the mixture and stirring is continued for up to thirty minutes depending upon the solubility of the hydrophobe agent in the mixture. Lastly, the alkyl silicate is added. Thereafter, the mixture is allowed to stir until gelation occurs. When this order of mixing is to be used in continuous manufacturing processes, it is preferable to use formulations which gel (in the absence of the type of shearing discussed, infra), in less than about five minutes after the addition of the alkyl silicate. One example of a continuous manufacturing process would be where the reactants are continuously mixed together in a reaction tube and are piped or transferred to a holding area rather than being made using a batch process. The gelled or non-fluid mixture (the appearance of the gelled mixture can range from hard and crumbly to soft and gelatinous) is then allowed to age until a dried sample of the silica filler exhibits at least 70%, and preferably substantially 100%, hydrophobicity according to the water flotation test. The aging period can last up to 24 hours, but preferably lasts from 30 minutes to 4 hours. At that point the resulting silica filler containing composition can be filtered and/or oven-dried to remove the volatile components of the composition, or preferably, the gel can be transferred to the site where blending with a polydiorgano-siloxane gum is to take place by means of, for example, a screw conveyor. At that point, the gel can be directly incorporated into a polydiorganosiloxane gum using an apparatus such as a two-roll mill, twin-screw mixer or a bread dough mixer. The mixture is then heated to remove the volatile components and to obtain a filler-containing elastomer formulation for use in preparing silicone rubber. When the filler is to be dried prior to incorporation into a gum, it is preferable to age the filler for at least 24 hours prior to drying and to masticate the filler-gum blend under heating to break up any filler agglomerates formed during the drying process. In a similar fashion, low viscosity polydiorganosiloxanes can be mixed with the gelled filler compositions or the dry filler to provide formulations suitable for use in preparing silicone rubber.

During the preparation of the filler, the mixing process can be carried out at room temperature (20°-25° C.) or with heating at temperatures up to the boiling point of the alcohols present. The hydrolysis reaction is exothermic and heat is generated during the initial addition of the alkyl silicate. Carrying out the aging above room temperature can be helpful in increasing the tensile strength and elongation values obtained using these fillers, but reduces the modulus at 100% elongation when the hydrophobe agent is added prior to the addition of the alkyl silicate. However, heating during the execution of the mixing and aging steps is not required and satisfactory hydrophobic reinforcing silica fillers can be obtained in the absence of an external source of heating when hydrophobe agents such as R'O(R$_2$SiO)$_y$R', among others, are employed as will be shown in the examples.

The term "desired gelation" is intended to mean that actual gelation of the composition need not occur, but can be allowed to occur if it is desired as, for example, when the gelled filler containing composition is to be stored prior to use. It is not essential that gelation actually occur in order to obtain an operative filler. A preferred method is to employ a mechanical stirrer with a sufficient amount of ability to shear the mixture (higher torque) so that gelation of the silica-containing composition does not occur. The composition thereby remains fluid for a sufficient amount of time to enable the composition to be mechanically pumped through pipes. However, the composition may begin to form a gel once the shearing force is stopped. This procedure has the advantage of enabling a continuous blending operation to be employed wherein the fluid silica-containing composition is pumped directly to the site where it is added to a formulation comprising at least one polydiorganosiloxane by an apparatus such as a twin-screw mixer and thereby avoids the inconvenience of handling a gelled material. Other shearing means besides a stirrer, such as shaking, can be employed to produce a fluid mixture. When a shearing means is employed to produce a fluid composition, it can be preferable to use a formulation which contains about 10 parts or less of theoretical SiO$_2$ units per 100 parts by weight of hydrolysis mixture because as the theoretical SiO$_2$ content is increased above about 10 parts by weight, the resulting compositions begin to take on a hard and powdery appearance due to the increase in total filler solids and the corresponding decrease in liquid present in the composition. An excessive amount of shearing can result in a decrease in filler reinforcing ability as indicated by a reduction in the ultimate tensile strength value exhibited by silicone rubbers containing such fillers. The above-described formulation can contain other fillers, processing aids and the like or else can be at least one polydiorganosiloxane to which fillers, catalysts and other additives are later added.

Alternatively, the hydrophobe agent and the alkyl silicate can be mixed together and added as a blend to the water, alcohol and basic catalyst. The mixture is then allowed to stir until gelation occurs, if gelation of the mixture is desired. This method is preferable when the hydrophobe agent is also the sole source of basic catalyst. To insure the formation of a silica filler containing the proper structure, the basic catalyst should be added prior to or concurrent with the addition of the alkyl silicate to the water. However, when monomeric alkyl silicates are employed, this order of catalyst addition may not be critical as long as a sufficient amount of alcohol is present to render the alkyl silicate soluble prior to addition of the catalyst.

A third alternative embodiment of the method of the present invention involves the addition of the hydrophobe agent after the alkyl silicate has been added to the water, alcohol and at least one basic catalyst to form a hydrolysis mixture, but prior to the gelation of the hydrolysis mixture. When one desires to use this embodiment of the method, the formulation of the hydrolysis mixture should be chosen so that the hydrolysis mixture itself (no hydrophobe agent being present) remains fluid from about thirty minutes on up to one or two days at room temperature. One way that this can be done is simply by selecting a formulation and mixing the ingredients together using a low shear mixing device such as a laboratory magnetic stirring bar mixer operated at low to moderate rate of stirring. The amount of time that is required for the hydrolysis mixture to become sufficiently viscous to stop the stirring bar is then observed. The stirring bar should not stop turning for at least 30 minutes for that formulation to be considered useful in this embodiment. Such compositions do not require the type of shearing means described above to remain in a fluid state prior to the addition of the hydrophobe agent. The hydrolysis mixtures employed should be those which eventually form a gel, because such mixtures generally provide fillers which possess the proper structure to produce reinforcing silica fillers. Once the hydrophobe agent is added, the silica filler-containing compositions can remain fluid for thirty minutes up to about one or two days. The hydrophobe agent is to be added prior to the gelation of the hydrolysis mixture. Such fluid compositions can be prepared without the use of the shearing equipment noted earlier and it is possible to pump this fluid directly to the site where it can be directly blended with a polydiorganosiloxane gum. This enables one to allow some silica structure to develop prior to the addition of the hydrophobe agent and can also provide a means for staging the addition of the alkyl silicate to alter the structure of the silica and thereby modify its reinforcing ability. Thus, in the latter case, a portion of the alkyl silicate can be added, then, after a short period of time, the rest of the alkyl silicate and lastly, the hydrophobe agent. It is best to use a theoretical SiO$_2$ content of less than 10 parts by weight per 100 parts by weight of hydrolysis mixture when using this procedure and more preferably, between 5 and 8 parts by weight. This procedure is necessarily a two-stage process and detracts from the advantage possessed by the above essentially one-stage methods which require no exercise of control over the silica structure once the alkyl silicate has been added. The filler can then be aged as described above until the silica filler is sufficiently hydrophobic.

In light of the above discussion, the term "prior to the occurrence of any gelation" when used with reference to the time or order that the hydrophobe agent is added to the hydrolysis mixture is intended to mean that the hydrophobe agent must be added prior to the time that gelation of the hydrolysis mixture would occur in the absence of the use of the above-described shearing means or at such a time which would be consistent with the formation of the above-described hydrophobic reinforcing silica filler in cases where the hydrolysis mixture remains fluid for a significant amount of time (generally about 30 minutes or more) period of time in the absence of the use of the above-described shearing means.

As noted above, the method of the present invention provides a simple, efficient method for producing hydrophobic reinforcing silica fillers for silicone rubber which method is especially suitable for use in a continuous process for making polydiorganosiloxane compositions containing silica fillers and, as will be demonstrated in the Examples, highly reinforcing silica fillers which are capable of producing vulcanized silicone rubbers with tensile strength values in excess of 12.4 MPa (1,800 p.s.i.). Silicone rubbers with tear strengths of greater than 31 kiloNewtons per meter (kN/m) (180 p.p.i.) can be obtained using fillers obtained through the use of this method. These fillers are useful in high consistency and low consistency elastomer formulations. The method of the present invention can be used to prepare silica fillers, some of which, when incorporated into polydiorganosiloxane gums such as polydimethylsiloxane or 3,3,3-trifluoropropylmethylpolysiloxane gums, provide optically clear vulcanized silicone rubbers without requiring that the refractive index of the polymer be matched to that of the filler. These compositions are described U.S. Patent Application Ser. No. 06/156,003 filed June 3, 1980, now abandoned, in the names of K. E. Polmanteer and H. L. Chapman entitled "Optically Clear Silicone Compositions Curable to Elastomers" which is filed concurrently herewith and assigned to the same assignee as is the present invention and is incorporated by reference to teach examples of optically clear compositions which can be formed using some of the fillers of the present invention. When optically clear silicone rubber is desired, it is best to avoid drying the filler to reduce agglomeration of filler particles into particles which are large enough to scatter light (approximately 400 millimicrons in diameter) and thereby reduce the optical clarity of the rubber.

The water flotation test for determining the hydrophobicity of silica fillers was performed by placing about five grams of the silica-containing composition in an aluminum weighing dish. The weighing dish was placed on a hot plate at 250° C. for about thirty minutes to completely dry the silica filler. A portion of the dried sample was pulverized with a spatula and about 0.3 grams of the powder was placed in a vial (4 cc volume) containing about 2.5 cc of water. The vial was stoppered and vigorously shaken. After shaking, the amount of powdered sample that floated on top of the water was visually estimated. If all of the dried silica powder floated at the top, the sample was deemed to possess 100% hydrophobicity according to this test (hereinafter referred to as % Hydrophobicity).

The test methods used in the following Examples were as follows. The filler surface area was measured using a continuous flow nitrogen adsorption method based on the one first described by Nelson, et al., *Anal. Chem.* 30, 1387ff (1958) which is a modification of the well-known Brunauer-Emmet-Teller (BET) Method. The percentage of silanol content was determined using a method based on the one described by Kellum, et al., *Anal. Chem.* 39, 1623ff (1967). The percentage alkoxy content was determined by acetylation using the perchloric acid catalyzed reaction of acetic anhydride in 1,2-dichloroethane followed by hydrolysis of the unreacted reagent with a 6/3/1 weight ratio solution of dimethylformamide/pyridine/water. The excess acid was titrated with standard potassium hydroxide solution and the percentage of alkoxy radical content was calculated. The weight percentage of total carbon content was obtained using a standard oxygen combustion method.

Elastomer formulations were prepared by mixing the filler (in various forms) with a polydiorganosiloxane gum, followed by the addition of a vulcanization catalyst. In the following Examples, Cure Procedure A indicates that the catalyst elastomer formulation was vulcanized or cured by heating a slab of the formulation under pressure in a molding chase 1.52 mm deep for 15 minutes at about 170°–175° C. and Cure Procedure B indicates that the heating under pressure was carried out for ten minutes at about 170°–175° C. Post-Cure Procedure A indicates that the vulcanized or cured silicone rubber was post-cured by heating in an oven for 1 hour at 150° C. Post-Cure Procedure B indicates that the vulcanized or cured silicone rubber was post-cured by heating in an oven for 1 hour at 150° C. followed by 4 hours at 200° C. Post-Cure Procedure C indicates that the silicone rubber was post-cured by heating for 4 hours at 200° C.

The plasticity of the uncured elastomer formulation or the unfilled gum was measured using a procedure based on that outlined in ASTM D926. A sample weighing either twice the specific gravity (in grams) of material containing a filler or four times the specific gravity (in grams) of unfilled gum is cut from the larger mass of material and rolled into a ball. The material, in the shape of a ball, was then allowed to age for one hour at 23°±1° C. The sample was then placed between the platens of a plastometer (Catalog No. C 544445 Parallel Plate Plastometer, Scott Tester, Inc., Providence, R.I.) and the upper plate was lowered until it just touched the top of the sample and was then released without dropping it. The plasticity reported is the thickness of the sample 3 minutes ±5 seconds after the release of the upper platen when the sample is at 23°±1° C. The physical properties of the cured and/or post-cured silicone rubbers were obtained using the following ASTM Methods: ASTM D412—ultimate tensile strength (tensile stress), elongation at break and modulus (or tensile stress) at 100% elongation; ASTM D624—tear (Die B); and ASTM D2240—durometer. In the tear tests, only two tear bars were tested per sample.

The following examples are intended as being merely illustrative and are not to be construed as limiting the scope of the present invention to those examples alone. The scope of the invention is properly defined by the appended claims. All parts and percentages reported in the following examples are by weight unless otherwise indicated.

EXAMPLES 1–3

These examples demonstrate one method for preparing hydrophobic reinforcing silica fillers for silicone rubber and the effect of hydrophobe agent concentration on hydrophobicity. The reactants were measured volumetrically at room temperature and the densities are indicated after each reactant to facilitate conversion from volume to weight in grams. Example 1: 16.0 milliliters (ml) water (density ∼1.0), 243.6 ml methanol (density ∼0.791), 1.7 ml hexamethyldisilazane (density ∼0.77) and 60.0 ml methyl orthosilicate (density ∼1.018)—the symbol "∼" means approximately. Example 2: 16.3 ml water, 240.1 ml methanol, 5.0 ml hexamethyldisilazane and 60.0 ml methyl orthosilicate. Example 3: 16.8 ml water, 234.6 ml methanol, 10 ml hexamethyldisilazane and 60.0 ml methyl orthosilicate.

Each formulation was prepared by adding the methanol and water to a "french" square bottle possessing a volume of about 470 cubic centimeters (cc) containing a magnetic stirring bar. The hexamethyldisilazane was then added and the mixture was allowed to stir for five minutes. Then the methyl orthosilicate was rapidly added and the mixture was allowed to stir at room temperature. The stirring bar, a low shear (torque) mixing device, stopped turning about five minutes after the addition of the methyl orthosilicate, indicating that the silica filler-containing composition had gelled. The gel was allowed to age for various intervals of time at room temperature (∼23° C.) and the % Hydrophobicity was then evaluated by the above-described water flotation test. The formulations contained about 9 weight percent of theoretical SiO$_2$ units per 100 parts by weight of hydrolysis mixture (7.5 g SiO$_2$/100 cc—calculated on a volume basis—exclusive of the amount of hydrophobe agent added. The actual solids content of Formulations A, B, and C were 11.0%, 11.4% and 12.1%, respectively, while the theoretical amount of water present initially was 120% of one-half of the water required to completely hydrolyze the alkoxy radicals present in the alkyl (methyl orthosilicate) silicate (hereinafter referred to as a percentage (%) of the "stoichiometric water"). The results are reported in Table I and the level of hydrophobe agent is reported in moles of hydrophobe agent per mole of theoretical SiO$_2$ units in the silica filler-containing composition.

TABLE I

| Example | Hydrophobe Agent Level | % Hydrophobicity | | | |
|---|---|---|---|---|---|
| | | 6 hours | 24 hours | 8 days | 70 days |
| 1 | 0.020 | 0 | 0 | 0 | 0 |
| 2 | 0.056 | 5 | 20 | 75 | 98 |
| 3 | 0.106 | 99 | 100 | 100 | 100 |

Thus, the data indicates that when hexamethyldisilazane is used as a hydrophobe agent, about 0.1 mole of hexamethyldisilazane per mole of theoretical SiO$_2$ units is required to obtain a silica filler possessing a substantial degree of hydrophobicity (at least 70% hydrophobicity) within a reasonably short amount of time (approximately 24 hours). Fillers possessing less than (this degree) of hydrophobicity are undesirable because coherent gum stocks cannot be formulated without the additional use of a significant amount of a silica pacifying agent such as a low molecular weight hydroxy-endblocked polydimethylsiloxane fluid. This Example also demonstrates the production of a filler wherein the basic catalyst is derived solely from the hydrophobe agent.

Examples 4–6

In these examples, the production of a fluid silica filler-containing composition was demonstrated utilizing a gear-driven mechanical stirring blade possessing a higher degree of shearing ability (torque) than the magnetic stirring bar used in Example 1. Three different examples were prepared using the same formulation. Two milliliters of water, 47 ml of concentrated aqueous ammonium hydroxide (density ~0.9 g/ml, ~28.4% NH$_3$ content) and 212 ml of methanol were added to a container and stirred. Then 16 grams of a solid hydrophobe agent consisting principally of hexamethylcyclotrisiloxane (hereinafter referred to as Hydrophobe Agent A) was added and allowed to stir at room temperature until the solid material was completely dissolved (approximately 10 minutes). Then 60 ml of methyl orthosilicate was rapidly added and allowed to stir. The actual hydrophobe agent produced by adding Hydrophobe Agent A to an alkaline medium and allowing it to age is believed to be a mixture of linear polydimethylsiloxanes of an average formula CH$_3$O{(CH$_3$)$_2$SiO}$_y$R' where y and R' were previously defined.

Example 4 was prepared using a gear-driven mechanical stirring blade and was vigorously mixed while the reagents were added and throughout the entire 24-hour room temperature aging period. The silica-containing composition did not form a gel and remained a pourable fluid.

Example 5 was prepared using the above formulation and a low torque (shear) magnetic stirring bar. The composition was allowed to gel and after one hour, the gel was broken up using a gear-driven mechanical stirring blade and vigorously stirred for an additional 23 hours at room temperature. The silica filler-containing composition obtained was a pourable fluid, but was distinctly more viscous than Example 4.

Example 6 was prepared using a low torque (shear) magnetic stirring bar which stopped when the silica-containing composition gelled and the gel was allowed to age for 24 hours at room temperature.

The aged compositions were then evaluated by incorporating a sufficient amount of the fluid or gelled silica-containing composition into a polydimethylsiloxane gum to provide 65 parts of silica filler solids to every 100 parts by weight of gum. The polydimethylsiloxane gum used in these examples (hereinafter referred to as Gum A) was a dimethylvinylsiloxy-endblocked polydiorganosiloxane gum consisting essentially of 99.86 mole percent of dimethylsiloxane units and 0.14 mole percent of methylvinylsiloxane units based on the total moles of diorganosiloxane units present and had a plasticity (4.2 gram sample) in the range of about 1.40–1.65 millimeters (55–65 mils). The silica filler content of the composition was obtained by heating a small sample in a 125° C. oven for at least two hours and determining the solids content. The silica-filler containing composition was then added to the gum using a two-roll mill to form an elastomer formulation. This elastomer formulation was then devolatilized by hot milling for 30 minutes at about 105°–110° C. The milled elastomer formulation was then cooled to room temperature and one part of 2,5-dimethyl-2,5-di(t-butylperoxy)hexane catalyst (hereinafter referred to as Catalyst A) was added per 100 parts of gum present in the formulation. The catalyzed elastomer formulation was allowed to stand overnight and then re-milled for a short time to soften the stock. Cure Procedure A was then used. The physical properties of the resulting silicone rubbers obtained after using Post-Cure Procedures A and B are tabulated in Table II. The results indicate that the fillers obtained using the above mixing procedures are substantially equivalent.

TABLE II

| | Analytical Data - Dry Filler | | | | Physical Properties - Rubber[1] | | | |
|---|---|---|---|---|---|---|---|---|
| Example | Filler Surface Area (m$^2$/g) | Carbon Content[2] (Total %) | Methoxy Content (%) | Silanol Content (%) | Tensile Strength (MPa)[3] | Elongation At Break (%) | Modulus At 100% Elongation (MPa)[3] | Durometer (Shore A) |
| 4 | 332 | 11.8 | 1.31 | 1.90 | 11.10/10.96 | 640/600 | 1.13/1.45 | 61/68 |
| 5 | 327 | 12.2 | 1.20 | 1.80 | 10.00/10.96 | 665/600 | 1.21/1.64 | 56/68 |
| 6 | 284 | 12.3 | 1.10 | 2.21 | 10.34/ | 670/630 | 1.24/1.48 | 55/67 |

TABLE II-continued

| | Analytical Data - Dry Filler | | | | Physical Properties - Rubber[1] | | | |
|---|---|---|---|---|---|---|---|---|
| Example | Filler Surface Area ($m^2/g$) | Carbon Content[2] (Total %) | Methoxy Content (%) | Silanol Content (%) | Tensile Strength (MPa)[3] | Elongation At Break (%) | Modulus At 100% Elongation (MPa)[3] | Durometer (Shore A) |
| | | | | | 11.58 | | | |

[1]First figure - Post-Cure Procedure A, second figure - Post-Cure Procedure B
[2]Includes carbon contributed by methoxy radicals present
[3]MPa is megapascals (6.895 MPa = 1,000 p.s.i.)

EXAMPLE 7

This example demonstrates the effect of varying the filler to gum ratio on the physical properties of the silicone rubber. The formulation used to prepare the filler consisted of 204.7 ml methanol, 13.4 ml water, 37.7 ml concentrated aqueous ammonium hydroxide, 30 ml hexamethyldisilazane and 60 ml of methyl orthosilicate. The procedure of Example 1 was followed except that the hexamethyldisilazane was allowed to stir for ten minutes prior to the addition of the methyl orthosilicate and was aged for 24 hours prior to use. Two batches of filler-containing composition were prepared. One batch contained an average solids content of 11.6% and the other batch 11.3%.

The formulations in Table III were prepared using the wet silica filler-containing composition produced above. The solids content of the composition was determined and a sufficient amount of the composition was added to 20 g of Gum A and 25 ml of toluene to result in the indicated parts of silica filler per 100 parts of gum (phg). The formulation was mixed in a laboratory size bread dough mixer and then hot-milled for 30 minutes at about 105° C.–110° C. on a two-roll mill. The formulation was cooled, and one part of Catalyst A was added. The samples initially exhibited some creping and were allowed to stand overnight at room temperature. The samples were softened by re-milling, cured using Cure Procedure B and post-cured using Post-Cure Procedure B. Table III shows that the tensile strength and modulus increased as the filler loading was increased. Note that at above 50 phg, tensile strengths of greater than 12.4 MPa are obtained.

TABLE III

| Filler Level (phg)[1] | Tensile Strength (MPa) | Modulus At 100% Elongation (MPa) | Elongation At Break (%) |
|---|---|---|---|
| 30 | 6.79 | 0.93 | 440 |
| 40 | 8.96 | 1.07 | 455 |
| 50 | 12.48 | 1.21 | 525 |
| 60 | 13.80 | 1.55 | 535 |
| 70 | 13.24 | 1.79 | 515 |

[1]Parts of filler solids per 100 parts of gum.

EXAMPLE 8

The effect of aging time at room temperature on the hydrophobicity and the physical properties of a vulcanized silicone rubber was demonstrated in this example. The silica fillers were prepared according to the procedure used in Example 6 using the following formulation: 531.2 ml methanol, 5 ml water, 117.4 ml concentrated aqueous ammonium hydroxide, 39.6 g Hydrophobe Agent A and 150 ml methyl orthosilicate. At each period of time a sample was withdrawn. Each sample obtained was divided into two portions. One portion was quickly washed with water to stop the aging process. The wet filter cake obtained was then oven-dried for a short time at 50° C. and then vacuum dried at 50° C. for 16 hours. The hydrophobicity of the dried sample was measured using the water flotation test. The other portion of the sample was directly incorporated into a gum according to the procedure used in Examples 4–6. The formulation was: 20 parts of Gum A, 12 parts of silica filler solids introduced as the wet composition, 0.2 g of Catalyst A and 1 ml of a hydroxy-endblocked polydimethylsiloxane fluid having about 4 weight percent silicon-bonded hydroxyl radicals and a viscosity of about 40 $\mu m^2/s$ (hereinafter referred to as Fluid A). The small amount of Fluid A was added to the gum and filler during processing to facilitate transfer of the filler to the gum and to reduce "crepe hardening." It may not have been necessary in all cases, but all samples contained it to give a consistent basis for comparison. Each sample was then cured using Cure Procedure B. The results are tabulated in Table IV and indicate that the fillers produced have the proper structure to reinforce silicone rubber although the optimum degree (~100%) of hydrophobicity is not reached until the filler has been aged for about 24 hours.

TABLE IV[1]

| Aging Time | % Hydrophobicity | Plasticity (uncured) (millimeters) | Tensile Strength (MPa) | Modulus At 100% Elongation (MPa) | Elongation At Break (%) |
|---|---|---|---|---|---|
| 15 min. | 50% | 2.29 | 3.65 | 2.00 | 295 |
| 30 min. | 70% | 4.44 | 7.79 | 1.69 | 560 |
| 1 hr. | 80% | 5.49 | 9.58 | 1.31 | 630 |
| 4 hrs. | 96% | 5.21 | 10.00 | 1.10 | 675 |
| 6 hrs. | 90% | 5.56 | 11.17 | 1.17 | 700 |
| 1 day | 98% | 5.23 | 9.96 | 1.10 | 680 |
| 3 days | 100% | 5.41 | 10.10 | 1.03 | 680 |
| 7 days | 100% | 5.69 | 11.96 | 0.96 | 730 |

[1]Average physical properties after using Cure Procedure B only.

EXAMPLE 9

In this example the physical characteristics of the dry fillers as a function of aging time were related to the physical properties of the silicone rubber obtained. The filler was prepared using the procedure in Example 7. The formulation was as follows: 511.7 ml methanol, 33.4 ml water, 94.2 ml concentrated aqueous ammonium hydroxide, 75 ml hexamethyldisilazane and 150 ml methyl orthosilicate. The filler was aged, washed, formulated with a gum and catalyst and then cured to form a silicone rubber. The elastomer formulation was the same as in Example 8, but the filler was washed with water prior to being added to the gum and about 25 ml of toluene was added to the gum to facilitate transfer of the filler to the gum. The first sample (15 min.) creped badly, but eventually it became incorporated into the gum after more than 30 minutes of milling. The sample aged four hours was easily incorporated into the gum. The filler properties were obtained using the oven-dried (see Example 8) filler. The results are tabulated in Table V. The surface area of the fillers averaged 415 $m^2/g$.

TABLE V

| | Analytical Data - Dry Filler | | | | | Physical Properties - Rubber[2] | | |
|---|---|---|---|---|---|---|---|---|
| Aging Time | Carbon[1] Content (Total %) | Methoxy Content (%) | Silanol Content (%) | % Hydro- phobicity | Plasticity (uncured) (millimeters) | Tensile Strength (MPa) | Modulus At 100% Elongation (MPa) | % Elongation At Break (%) |
| 15 min. | 5.86 | <0.10 | 4.81 | 10 | 8.10 | 6.24 | 3.62 | 260 |
| 30 min. | 8.25 | 0.21 | 4.19 | 95 | 8.74 | 8.76 | 2.72 | 350 |
| 1 hr. | 9.28 | <0.10 | 5.17 | 100 | 4.95 | 10.00 | 1.72 | 510 |
| 4 hrs. | 10.3 | 0.12 | 3.28 | 100 | 4.65 | 10.62 | 1.45 | 560 |
| 23 hrs. | 11.0 | <0.10 | 2.94 | 100 | 4.47 | 10.93 | 1.45 | 580 |
| 3 days | 10.7 | 0.23 | 2.08 | 100 | 4.11 | 11.27 | 1.34 | 585 |
| 7 days | 10.7 | <0.10 | 2.88 | 100 | 4.11 | 11.34 | 1.31 | 600 |

[1]Includes carbon contributed by methoxy radicals present.
[2]Physical properties after following Cure Procedure B only.

The data in Table V indicates that after one hour, approximately 85% of the hydrophobe agent is present on the filler as measured by carbon content. The plasticity of the uncured formulation and the percent elongation of the cured rubber after one hour exhibit marked changes when compared to the values obtained after 30 minutes aging time.

EXAMPLES 10-21

These examples demonstrate the effect of changing the initial concentration of hydrophobe agent. The variation in cured silicone rubber properties as a function of filler loading levels is also shown. The basic formulation used was: 22.1 ml concentrated aqueous ammonium hydroxide, 28.9 ml of a solution of ammonia gas in methanol (~0.11 g $NH_3$/ml solution, density ~0.8 g/ml, hereinafter referred to as $NH_3$/methanol solution), 60 ml methyl orthosilicate, hydrophobe agent solution and an additional amount of methanol. The fillers were prepared by mixing the water, ammonium hydroxide and $NH_3$/methanol solution together. The hydrophobe agent solution was then added, immediately followed by the methyl orthosilicate. The compositions were aged overnight at room temperature prior to use. All samples exhibited 100% hydrophobicity as measured by the water flotation test.

The hydrophobe agent solution used in these examples, which is hereinafter referred to as Sol'n A, was prepared by mixing the following ingredients together and refluxing the mixture for two hours time: 100 grams of Hydrophobe Agent A, 49.4 g methanol and 0.565 ml of $NH_3$/methanol solution. The total amount of hydrophobe agent solution and methanol in the formulation was adjusted such that the total amount of methanol present in these two ingredients remained constant as the initial Hydrophobe Agent A concentration was increased. The grams of Hydrophobe Agent A added per milliliter of methyl orthosilicate is shown in Table VI as is the molar ratio of Hydrophobe Agent A to moles of theoretical $SiO_2$ units. For purposes of calculation and comparison, it is assumed that the hydrophobe agent present in Sol'n A is hexamethylcyclotrisiloxane (see Examples 4-6). Thus, Sol'n A contained about 66 weight percent of Hydrophobe Agent A and had a density of about 0.92 g/ml. The total amount of methanol present in the Sol'n A and additional methanol was 68.7 ml. For example, the amount of additional methanol and Sol'n A in Example 14 was 55.5 ml and 35.2 ml, respectively, while in Example 15, 50.9 ml and 47.4 ml, respectively, were used. In these examples, the percentage of excess water (% EWM) was 0, the weight percent of theoretical $SiO_2$ units present exclusive of the amount of hydrophobe agent solution was 14 percent and the amount of $NH_3$ present was about 4.3 g per 100 g of total silica filler-containing composition. Thus, the total amount of methanol present in these ingredients was 68.7 ml.

The filler was formulated into Gum A at the desired filler level using unwashed silica-containing gel according to the procedure described for Examples 4-6. The average physical properties of the silicone rubbers is tabulated in Table VII.

In general, about 0.88 moles of Hydrophobe Agent A per mole of theoretical $SiO_2$ units is required to produce hydrophobic reinforcing silica fillers while the upper limit appears to be between 0.40 and 0.54 moles at the highest filler to gum levels used. In general, as the concentration of hydrophobe agent is increased at a constant filler to gum level, the modulus at 100% elongation and the tear values of the cured silicone rubber decreased and the elongation at break values increased. At 40 phg, an increase in hydrophobe agent concentration resulted in an increase in tensile strength value but a decrease in tensile strength at 60 phg and higher was observed as the concentration of hydrophobe agent was increased over the concentration ranges studied. Examples 20 and 21 are presented for comparative purposes.

TABLE VI

| | Hydrophobe Agent A Concentration | | Analytical Data (Oven-Dried Filler) | | | |
|---|---|---|---|---|---|---|
| Example | g/ml Si(OCH$_3$)$_4$ | moles/mole SiO$_2$ | Carbon Content (Total %) | Methoxy Content (%) | Silanol Content (%) | Adjusted Carbon Content[1] (%) |
| 10 | 0.125 | 0.084 | 10.18 | 4.67 | 1.04 | 8.4 |
| 11 | 0.167 | 0.113 | 11.47 | 4.16 | 0.72 | 9.9 |
| 12, 13 | 0.208 | 0.141 | 12.38 | 3.43 | 0.67 | 11.0 |
| 14, 16 | 0.360 | 0.244 | 14.9 | 3.2 | 1.33 | 13.7 |
| 15, 17 | 0.485 | 0.329 | 16.0 | 3.2 | 1.37 | 14.9 |
| 18, 19 | 0.600 | 0.405 | 18.0 | 3.82 | 0.88 | 16.6 |
| 20 | 0.800 | 0.540 | 18.79 | 2.55 | 1.03 | 17.9 |

TABLE VI-continued

| | Hydrophobe Agent A Concentration | | Analytical Data (Oven-Dried Filler) | | | |
|---|---|---|---|---|---|---|
| | | | Carbon Content | Methoxy Content | Silanol Content | Adjusted Carbon Content[1] |
| Example | g/ml Si(OCH$_3$)$_4$ | moles/mole SiO$_2$ | (Total %) | (%) | (%) | (%) |
| 21 | 1.000 | 0.676 | NA | NA | NA | NA |

[1]This figure reflects the calculated percentage of carbon present on the filler assumed to be contributed by the hydrophobe agent only.
NA - Not Available

TABLE VII

| | | Physical Properties - Rubber[1] | | | |
|---|---|---|---|---|---|
| Example | Filler Level (phg) | Tensile Strength (MPa) | Modulus At 100% Elongation (MPa) | Elongation At Break (%) | Tear (Die B) (kN/m)[2] |
| 10 | 40 | 6.90 | 2.55 | 335 | 20.8 |
| 11 | 40 | 10.76 | 1.28 | 535 | 10.9 |
| 12 | 40 | 10.14 | 1.16 | 545 | 11.4 |
| 13 | 60 | 11.89 | 1.45 | 590 | 25.6 |
| 14 | 60 | 10.62 | 1.04 | 680 | 18.9 |
| 15 | 60 | 9.24 | 0.83 | 705 | 17.2 |
| 16 | 80 | 9.79 | 1.50 | 610 | 33.1 |
| 17 | 80 | 9.86 | 1.10 | 745 | 32.4 |
| 18 | 80 | 9.72 | 0.86 | 760 | 19.1 |
| 19 | 120 | 8.14 | 1.10 | 800 | 34.5 |
| 20 | 120 | 5.34 | 0.42 | 875 | 17.2 |
| 21 | 120 | 4.07 | 0.43 | 915 | 11.7 |

[1]Average values obtained after using Cure Procedure A and Post-Cure Procedure B.
[2]kN/m is kiloNewtons per meter (175 kN/m = 1,000 p.p.i.).

EXAMPLE 22-30

These examples demonstrate the effect of varying the water, alcohol and catalyst concentration over a relatively narrow range of theoretical SiO$_2$ content. Each formulation contained 30 ml of methyl orthosilicate and 15 ml of hexamethyldisilazane. The other reactants are listed in Table VIII along with the calculated amounts of each reactant. The fillers were prepared according to the procedure of Example 7 (omitting the ammonium hydroxide addition in some examples). Table IX summarizes the physical properties of the silicone rubbers obtained using the formulation and procedure of Example 7 with 50 parts of silica filler solids per 100 parts of gum (phg) and Cure Procedure B. Examples 24, 26, 27, 29 and 30 are presented as comparative examples. The percentage found under the heading "stoichiometric water" used in Table VIII (and hereinafter) is calculated by dividing the total moles of water initially present by the sum of one-half of the stoichiometric amount of water required to completely hydrolyze the methyl orthosilicate and the amount of water necessary to hydrolyze the hexamethyldisilazane (2 moles of water per mole of hexamethyldisilazane) and multiplying that quotient by 100.

The data in Tables VIII and IX indicates that at the lowest value of %EWM tested (a high proportion of alcohol to water in the hydrolysis mixture), reinforcing fillers (evidenced by tensile strengths greater than 6.2 MPa) are produced at all three levels of basic catalyst tested and an increase in the catalyst level results in an increase in the tensile strength value. At 47.1% EWM (relatively equal proportions of water and alcohol in the hydrolysis mixture), only Example 23, which contained the lowest level of basic catalyst, produced a reinforcing filler. At 79.7% EWM (relatively high proportion of water to alcohol in the hydrolysis mixture), none of the fillers were reinforcing and the tensile strength values decrease slightly as the level of basic catalyst is increased.

TABLE VIII

| | Reactants Added (ml) | | | Theoretical SiO$_2$ Content[2] | | Stoichiometric Water | | NH$_3$ Content[4] |
|---|---|---|---|---|---|---|---|---|
| Example | Methanol | Water | NH$_4$OH[1] | (g/100 g) | (g/100 ml) | (%) | % EWM[3] | (g/100 ml) |
| 22 | 97.3 | 18.4 | — | 9.6 | 8.3 | 190 | 8.8 | 0.75 |
| 23 | 49.4 | 66.3 | — | 8.9 | 8.3 | 680 | 47.1 | 0.75 |
| 24 | 1.5 | 114.2 | — | 8.3 | 8.3 | 1,170 | 79.7 | 0.75 |
| 25 | 99.8 | 12.6 | 9.4 | 9.2 | 7.9 | 190 | 8.8 | 2.17 |
| 26 | 51.0 | 61.4 | 9.4 | 8.6 | 7.9 | 690 | 47.1 | 2.17 |
| 27 | 2.1 | 110.3 | 9.4 | 8.0 | 7.9 | 1,190 | 79.7 | 2.17 |
| 28 | 102.3 | 6.7 | 18.8 | 8.9 | 7.6 | 190 | 8.8 | 3.48 |
| 29 | 52.5 | 56.5 | 18.8 | 8.3 | 7.6 | 700 | 47.1 | 3.48 |
| 30 | 2.6 | 106.4 | 18.8 | 7.7 | 7.6 | 1,210 | 79.7 | 3.48 |

[1]Concentrated aqueous ammonium hydroxide
[2]First figure - grams SiO$_2$ per 100 grams of hydrolysis mixture; second figure - grams of SiO$_2$ per 100 ml of hydrolysis mixture. "Hydrolysis mixture" excludes the amount of hydrophobe agent added.
[3]Percentage of excess water in the hydrolysis mixture, see specification.
[4]Grams of ammonia as NH$_3$ per 100 ml of total silica-filler containing composition including the amount of hydrophobe agent added.

TABLE IX

| | Analytical Data - Dry Filler | | Plasticity (uncured) (millimeters) | Physical Properties - Rubber | | |
|---|---|---|---|---|---|---|
| Example | Carbon Content (Total %) | Surface Area (m$^2$/g) | | Tensile Strength (MPa) | Modulus At 100% Elongation (MPa) | Elongation At Break (%) |
| 22 | 12.5 | 600 | 4.09 | 9.48 | 1.07 | 525 |
| 23 | 13.4 | 570 | 5.00 | 8.65 | 0.97 | 520 |
| 24 | 15.3 | 335 | 2.69 | 3.28 | 0.69 | 345 |
| 25 | 10.8 | 500 | 3.71 | 11.76 | 1.17 | 530 |
| 26 | 7.2 | 170 | 1.93 | 4.00 | 1.21 | 245 |
| 27 | 16.3 | 65 | 2.13 | 2.93 | 0.59 | 400 |
| 28 | 9.8 | 465 | 3.56 | 12.55 | 1.34 | 515 |

TABLE IX-continued

| | Analytical Data - Dry Filler | | | Physical Properties - Rubber | | |
|---|---|---|---|---|---|---|
| Example | Carbon Content (Total %) | Surface Area (m hu 2/g) | Plasticity (uncured) (millimeters) | Tensile Strength (MPa) | Modulus At 100% Elongation (MPa) | Elongation At Break (%) |
| 29 | 6.1 | 95 | 1.40 | 4.52 | 1.28 | 275 |
| 30 | 13.1 | 60 | 1.91 | 3.00 | 0.79 | 290 |

[1]Average physical properties obtained after using Cure Procedure B and Post-Cure Procedure B.

EXAMPLES 31–48

In these examples the effect of varying the theoretical $SiO_2$ content, water, methanol and ammonia catalyst levels at a constant level of hydrophobe agent was observed. In these examples, the amount of methyl orthosilicate used was 60 ml. In Examples 31 through 45 inclusive, 20 g of Hydrophobe Agent A was dissolved in the methyl orthosilicate and that solution was rapidly added to a stirring mixture of water, methanol, ammonia and $NH_3$/methanol solution (if used) at room temperature. The amounts of reactants used are found in Table X. The solution was allowed to gel and was aged for 24 hours at room temperature. The silica filler-containing composition was then incorporated into Gum A and cured using the formulation and procedure described in Example 8. In Examples 46 and 47, 15.84 g of Hydrophobe Agent A was added to the other ingredients 10 minutes prior to the addition of the methyl orthosilicate. The rest of the procedure was the same as above. In Example 48, 24 ml of Sol'n A was added to the water, alcohol and ammonium hydroxide just prior to the addition of 60 ml of methyl orthosilicate.

The physical properties of the vulcanized silicone rubbers are tabulated in Table XI. Comparative Examples 31, 32, and 42 are not considered reinforcing for the purposes of the present invention. These examples show that the reinforcing properties of the fillers are dependent upon the ratios of water, methanol and catalyst at a relatively constant solids level and initial hydrophobe agent concentration. Thus, for a given formulation, the physical properties of a vulcanized silicone rubber containing the silica-filler must be evaluated to determine whether the filler is reinforcing for the purposes of the present invention.

TABLE X[1]

| | Reactants Added (ml) | | | | Theor. $SiO_2$ Content | | Stoich. Water[3] | | $NH_3$ Content |
|---|---|---|---|---|---|---|---|---|---|
| Example | Methanol | Water | $NH_4OH$ | $NH_3$/Methanol Solution[2] | (g/100 g) | (g/100 ml) | (%) | % EWM[3] | (g/100 ml) |
| 31 | 28.1 | 18.3 | 14.2 | — | 21.1 | 20.0 | 190 | 15 | 2.5 |
| 32 | 31.5 | 5.4 | 23.6 | — | 21.4 | 20.0 | 143 | 7.5 | 4.1 |
| 33 | 36.7 | 19.1 | 4.7 | — | 21.2 | 20.0 | 153 | 8.8 | 0.8 |
| 34 | 41.1 | 5.3 | 14.2 | — | 21.6 | 20.0 | 100 | 0 | 2.5 |
| 35 | 108.1 | 33.3 | 8.2 | — | 12.9 | 11.5 | 267 | 15 | 0.9 |
| 36 | 97.9 | 10.8 | 41.0 | — | 13.2 | 11.5 | 257 | 15 | 4.5 |
| 37 | 114.9 | 10.1 | 24.6 | — | 13.1 | 11.5 | 180 | 7.5 | 2.7 |
| 38 | 114.9 | 10.1 | 24.6 | — | 13.1 | 11.5 | 180 | 7.5 | 2.7 |
| 39 | 114.9 | 10.1 | 24.6 | — | 13.1 | 11.5 | 180 | 7.5 | 2.7 |
| 40 | 132.3 | 9.2 | 8.2 | — | 13.2 | 11.5 | 100 | 0 | 0.9 |
| 41 | 83.0 | 0.0 | 22.4 | 44.2 | 13.2 | 11.5 | 100 | 0 | 4.5 |
| 42 | 602.4 | 46.9 | 94.3 | — | 3.6 | 3.0 | 745 | 15 | 2.9 |
| 43 | 670.8 | 41.4 | 31.4 | — | 3.6 | 3.0 | 427 | 7.5 | 1.0 |
| 44 | 495.9 | 0.0 | 91.5 | 156.2 | 3.6 | 3.0 | 407 | 7.4 | 4.9 |
| 45 | 550.2 | 0.0 | 22.4 | 171.0 | 3.7 | 3.0 | 100 | 0 | 2.9 |
| 46 | 45.4 | 8.9 | 19.6 | — | 19.5 | 18.0 | 131 | 7.5 | 3.3 |
| 47 | 52.5 | 1.8 | 19.6 | — | 19.5 | 18.0 | 82 | — | 3.3 |
| 48 | 25.0 | 5.3 | 14.2 | — | 24.4 | 23.1 | 100 | 0 | 3.0 |

[1]See Table VIII for explanation of headings used in various columns.
[2]See Examples 10–21 for composition.
[3]Exclusive of the amount of hydrophobe agent.

TABLE XI[1]

| Example | % Solids (Wet Filler) | Plasticity (uncured) (millimeters) | Tensile Strength (kPa) | Modulus At 100% Elongation (kPa) | Elongation At Break (%) | Tear Die B (kN/m) | Durometer (Shore A) |
|---|---|---|---|---|---|---|---|
| 31 | 23.7 | 1.34 | 4.00 | 0.69 | 520 | 11.9 | 37 |
| 32 | 25.4 | 1.17 | 3.71 | 0.59 | 530 | 10.6 | 32 |
| 33 | 24.6 | 2.65 | 6.67 | 1.28 | 575 | 21.9 | 59 |
| 34 | 27.5 | 1.61 | 6.45 | 0.62 | 725 | 11.0 | 38 |
| 35 | 18.4 | 5.44 | 12.76 | 1.45 | 750 | 24.0 | 66 |
| 36 | 19.0 | 2.06 | 6.54 | 0.83 | 600 | 18.0 | 47 |
| 37 | 15.9 | 4.08 | 8.10 | 1.24 | 665 | 27.5 | 67 |
| 38 | 17.5 | 2.67 | 9.00 | 1.07 | 695 | 24.7 | 54 |
| 39 | 18.9 | 2.56 | 8.72 | 0.90 | 715 | 20.5 | 52 |
| 40 | 19.7 | 5.15 | 11.17 | 1.83 | 715 | 18.9 | 61 |
| 41 | 19.7 | 4.32 | 12.29 | 1.07 | 815 | 26.7 | 55 |
| 42 | 4.9 | 1.88 | 6.12 | 0.97 | 465 | 10.6 | 45 |
| 43 | 5.4 | 5.68 | 9.99 | 3.10 | 590 | 23.2 | 74 |
| 44 | 5.0 | 3.11 | 9.16 | 1.14 | 555 | 17.3 | 57 |
| 45 | 6.1 | 7.05 | 7.22 | 4.76 | 240 | 17.4 | 72 |
| 46 | 28.0 | 3.43 | 10.07 | 1.14 | 625 | 18.6 | 58 |
| 47 | 29.5 | 4.22 | 10.34 | 1.17 | 680 | 24.7 | 56 |

TABLE XI[1]-continued

| Example | % Solids (Wet Filler) | Plasticity (uncured) (millimeters) | Tensile Strength (kPa) | Modulus At 100% Elongation (kPa) | Elongation At Break (%) | Tear Die B (kN/m) | Durometer (Shore A) |
|---|---|---|---|---|---|---|---|
| 48 | 33.5 | NA | 8.04 | 1.17 | 470 | 13.0 | 47 |

[1]Average physical properties obtained after using Cure Procedure A and Post-Cure Procedure B.
NA - Not Available

EXAMPLES 49–55

These examples demonstrate the ability of other types of hydrophobe agents to render fillers made by the present method hydrophobic. The formulation used in Examples 49, 50, 51 and 55 was 26.6 g methanol, 0.25 ml water, 5.9 g concentrated aqueous ammonium hydroxide, 7.5 ml methyl orthosilicate and the volume of hydrophobe agent indicated in Table XII. The formulation used in Examples 52 to 54 was: 53.1 ml methanol, 0.5 ml water, 11.7 ml concentrated aqueous ammonium hydroxide, 12 ml of methyl orthosilicate and the indicated amount of hydrophobe agent. The hydrophobe agent was added to the stirring solution of water, methanol and ammonia at room temperature and allowed to stir for the time indicated in Table XII. At that point the methyl orthosilicate was quickly added and the mixture was allowed to age for various time periods. At the end of the time period, the filler was dried for one half hour on a hot plate and its hydrophobicity according to the water flotation test was measured. The hydrophobe agent solution (hereinafter Sol'n B) used in Examples 53 and 54 was prepared by mixing 100 g of Hydrophobe Agent A, 49.4 g of methanol and 0.11 g of ammonia gas with stirring. The mixture was aged for 24 hours at room temperature prior to use to produce a solution believed to be composed of a mixture having an average formula $CH_3O\{(CH_3)_2SiO\}yR'$ where R' can be hydrogen or a methyl radical and y has an average value of 1 to 12. In Example 53 the methyl orthosilicate was added immediately following the addition of Sol'n B. Example 49 required a rather long period of time to become completely hydrophobic, therefore, use of a larger amount of hydrophobe agent would be advisable.

EXAMPLES 56–59

The influence of vinyl-containing hydrophobe agents on the properties of vulcanized silicone rubber and the use of a mixture of hydrophobe agents was demonstrated in this example. The formulation used in Example 56 used the following proportions of ingredients: 212.48 ml methanol, 2 ml water, 46.96 ml concentrated aqueous ammonium hydroxide and 15.84 g Hydrophobe Agent A. In Examples 57 to 59, a vinyl-containing hydrophobe agent consisting principally of 1,3,5-trimethyl-1,3,5-trivinylcyclotrisiloxane (hereinafter Hydrophobe Agent B) was used. Table XIII indicates the amount of Hydrophobe Agents A and B used in preparing Examples 57 to 59 using the above formulation. The procedure used to prepare the filler and the elastomer formulation is found in Example 8.

TABLE XIII[1]

| Example | Hydrophobe Agent A (grams) | Hydrophobe Agent B (ml) | Vinyl (Mole %) | Tensile Strength (MPa) | Modulus At 100% Elongation (MPa) | Elongation At Break (%) | Tear Die B (kN/m) | Durometer (Shore A) |
|---|---|---|---|---|---|---|---|---|
| 56 | 15.84 | — | 0 | 12.31 | 1.41 | 705 | 27.8 | 66 |
| 57 | 15.76 | 0.098 | 0.5 | 8.65 | 2.76 | 445 | 32.4 | 76 |
| 58 | 15.68 | 0.195 | 1.0 | 9.00 | 3.24 | 385 | 33.1 | 76 |
| 59 | 15.52 | 0.390 | 2.0 | 8.45 | 4.27 | 290 | 32.6 | 76 |

[1]Average physical properties after using Cure Procedure B and Post-Cure Procedure B.

EXAMPLE 60

This example demonstrates the production of silica fillers using fluorine-containing hydrophobe agents. The filler formulation was: 210 ml methanol, 14 ml water, 38 ml concentrated aqueous ammonium hydroxide, 30 ml sym-tetramethyl-bis(3,3,3-trifluoropropyl)-disilazane and 60 ml methyl orthosilicate. The filler was prepared by adding the hydrophobe agent to the methanol, water and ammonium hydroxide solution with stirring. Addition of the hydrophobe agent resulted in the formation of a two-phase mixture. About ten minutes later, the methyl orthosilicate was added with rapid stirring and the mixture became clear. The composition was aged for about 10 days at room temperature prior to being incorporated into a gum according to the procedure outlined in Examples 4–6 using the following formulation: 100 parts of Gum B, 40 parts of filler solids

TABLE XII

| | Hydrophobe Agent | | Time Added | % Hydrophobicity[1] | | | | | |
|---|---|---|---|---|---|---|---|---|---|
| Example | Type | Amount (ml) | (min.) | 0.5 hr | 1 hr | 2 hr | 5 hr | 1 da | 7 da |
| 49 | {(CH$_3$)$_3$Si}$_2$O | 3.75 | 1 | 0 | 0 | 0 | 0 | 1 | 100 |
| 50 | Fluid A[2] | 2.77 | 1 | 100 | 100 | 100 | 100 | 100 | 100 |
| 51 | (C$_6$H$_5$)$_2$Si(OCH$_3$)$_2$ | 2.02 | 1 | 30 | — | 5 | 30 | 80 | 90 |
| 52 | (CH$_3$)$_2$Si(OCH$_3$)$_2$ | 5.00 | 5 | 98 | 95 | 99 | 100 | 100 | 100 |
| 53 | Sol'n B | 3.40 | 0 | 100 | 100 | 100 | 100 | 100 | 100 |
| 54 | Sol'n B | 3.40 | 5 | 100 | 100 | 100 | 100 | 100 | 100 |
| 55 | {(CH$_3$)$_2$SiO}$_4$ | 2.77 | 1 | 1 | — | 10 | 50 | 100 | 100 |

[1]hr = hours, da = days
[2]See Example 8 added as a wet, gelled composition and 1 part of Catalyst A. Gum B was a hydroxy-endblocked polydiorganosiloxane gum which consisted essentially of 99.33 mole percent of 3,3,3-trifluoropropylmethylsiloxane units and 0.67 mole percent of methylvinylsiloxane units based upon the total moles of diorganosiloxane units present in the polydiorganosiloxane and had a plasticity (5.6 gram sample) in the range of about 2.29 to 3.18 millimeters. The physical properties of the vulcanized fluorosilicone rubber obtained after using Cure Procedure B and Post-Cure B were: tensile strength 7.79 MPa, elongation at break-280% and durometer (Shore A)-42.

A second filler-containing composition was prepared according to the above-described procedure using the following formulation: 55.4 ml methanol, 25.7 ml $NH_3$/methanol solution, 22.5 g concentrated aqueous ammonium hydroxide, 15 ml sym-tetramethyl-bis(3,3,3-trifluoropropyl)disilazane and 60 ml methyl orthosilicate. The resulting silica-filler containing composition (22.7% solids) was incorporated into a gum as above using the following formulation: 100 parts of Gum B, 50 parts of filler solids added as a silica filler-containing composition and 1.6 parts of a 50% active paste of 2,4-dichlorobenzoyl peroxide (Cadox® 50, a product of the Noury Chemical Company, Burt, N.Y. 14028). This filler was prepared using a hydrophobe agent concentration of 0.254 moles per mole of theoretical $SiO_2$ units while the first formulation contained twice that concentration. The physical properties of the fluorosilicone rubber obtained using the above-described cure and post-cure were: tensile strength-10.89 MPa, elongation at break-325%, durometer (Shore A)-53 and tear (Die B)-28.2 kN/m.

A third filler-containing composition was prepared according to the procedure outlined in Example 6 using the following formulation: 410 ml of methanol, 26.8 ml water, 75.2 ml concentrated aqueous ammonium hydroxide, 31.5 g of a composition consisting primarily of 1,3,5-trimethyl-1,3,5-tris(3,3,3-trifluoropropyl)cyclotrisiloxane and 120 ml methyl orthosilicate. The resulting silica filler-containing composition (15.2% solids) was aged and incorporated into a gum using the formulation described for the first filler in this Example. The physical properties of the resulting flourosilicone rubber obtained using Cure Procedure A and Post-Cure Procedure C were as follows: tensile strength-6.89 MPa, elongation at break-305%, durometer (Shore A)-53 and tear (Die B)-13.5 kN/m.

EXAMPLE 61–68

These examples demonstrate the production of silica fillers by the addition of a hydrophobe agent subsequent to the addition of alkyl silicate, but prior to the gelation of the silica filler-containing composition.

The silica filler-containing compositions of Example 61–64 were prepared by mixing the amounts of water, methanol and concentrated aqueous ammonium hydroxide indicated in Table XIV together in a bottle containing a magnetic stirring bar (low shear mixing means). Then the methyl orthosilicate (MOS in Table XIV) was rapidly added to the stirring mixture and the ingredients were allowed to stir for 10 minutes without any additional heating (the temperature does rise due to heat generated upon hydrolysis of the alkyl silicate) and then the hexamethyldisilazane (HMDS in Table XIV) was added. In each case, the resulting composition remained fluid for at least 30 minutes after the addition of the hexamethyldisilazane: Example 61 gelled 40 minutes after the addition of the hydrophobe agent, Example 63 gelled in about 30 minutes, Example 62 was a hazy bluish fluid which became quite viscous after about 6 hours (the product had the consistency of a "cream") and Example 64 gelled after about 30 minutes (the silica gel formed began to shrink after gelation occurred). The samples were aged for 24 hours at room temperature prior to use.

Examples 65–68 were prepared in the same manner as shown for Examples 61–64, but two additions of methyl orthosilicate were made. Ten minutes after the first addition of methyl orthosilicate was made, the second addition of methyl orthosilicate indicated in Table XIV was made. In Examples 65 and 66, the hexamethyldisilazane was added about 12 minutes after the second methyl orthosilicate addition was made. In these two examples a small amount of precipitate was observed shortly after the second methyl orthosilicate addition was made. In Examples 67 and 68, the hexamethyldisilazane was added immediately following the second methyl orthosilicate addition.

The second addition of methyl orthosilicate is believed to alter the structure of the silica filler compared with the type of filler obtained without the use of such a second addition. The silica filler-containing compositions were aged 24 hours at room temperature prior to use. The composition produced in Example 66 gelled about 20 minutes after the addition of the hexamethyldisilazane whereas the compositions produced in Examples 65, 67 and 68 remained bluish fluids after 24 hours. The compositions of Examples 65 and 67 had a fairly high viscosity and had the consistency of a cream while that of Example 68 was a low viscosity, pourable fluid.

Elastomer formulations containing the silica fillers prepared in Examples 61–66 were prepared according to the procedure used in Example 7, while elastomer formulations containing the silica fillers prepared in Examples 67 and 68 were prepared according to the procedure used in Examples 4–6. The formulation employed was the same as in Example 8, (60 parts of filler solids to 100 parts of gum) but in Examples 61–66, about 25 ml of toluene was added to the gum prior to the incorporation of the filler to facilitate the transfer of the filler to the gum. Because Examples 62, 65 and 67 resulted in higher viscosity "creamy" compositions which were more difficult to handle using laboratory milling techniques, the filler compositions of Example 62 and 65 were added to a bread dough mixer in increments immediately followed by a small amount of water to facilitate transfer of the filler to the gum. The fluid filler composition of Example 68 was precipitated (recovered) by adding the filler composition to water and adding the water-washed filler to the gum. However, the creamy fluid composition of Example 67 was added in increments to the gum on a two-roll mill and was incorporated without using water. Cure Procedure B and Post-Cure Procedure B was used to obtain silicone rubbers. The physical properties of the cured silicone rubbers are tabulated in Table XV. Although the theoretical $SiO_2$ content (and therefore the actual amount of filler solids produced) is low, a highly reinforcing silica filler can be produced by this method as shown by Example 62. Example 64 is a comparative example.

TABLE XIV[1]

| Example | Reactants (ml) | | | | Hydrophobe Agent[3] | Theor. SiO$_2$ Content[2] | | Stoich. Water (%) | % EWM | NH$_3$ Conc. (g/100 ml) |
|---|---|---|---|---|---|---|---|---|---|---|
| | Methanol | Water | NH$_4$OH | MOS[2] | | (g/100 g) | (g/100 ml) | | | |
| 61 | 237.2 | 172.9 | 12.0 | 60 | 30 | 5.6 | 5.0 | 920 | 40.0 | 1.07 |
| 62 | 392.8 | 28.2 | 1.2 | 60 | 30 | 6.0 | 5.0 | 150 | 2.5 | 0.53 |
| 63 | 241.1 | 179.9 | 1.2 | 60 | 30 | 5.6 | 5.0 | 920 | 40.0 | 0.53 |
| 64 | 60.6 | 360.4 | 1.2 | 60 | 30 | 5.1 | 5.0 | 1,840 | 77.0 | 0.53 |
| 65 | 392.8 | 28.2 | 1.2 | 60(I) 12(II) | 36 | 7.0 | 5.8 | 120 | 1.5 | 0.61 |
| 66 | 237.2 | 172.9 | 12.0 | 60(I) 12(II) | 36 | 6.5 | 5.8 | 770 | 39.0 | 1.13 |
| 67 | 327.3 | 23.5 | 1.0 | 50(I) 10(II) | 30 | 7.0 | 5.8 | 120 | 1.5 | 0.61 |
| 68 | 327.3 | 23.5 | 1.0 | 50(I) 10(II) | 20 | 7.0 | 5.8 | 170 | 3.0 | 0.06 |

[1]See Table VIII and text in Examples 22–30 for explanation of headings.
[2]In Examples 65–68, the Roman Numeral denotes the first and second addition.
[3]The hydrophobe agent used in Examples 61–67 was hexamethyldisilazane and in Example 68 the figure indicates the grams of the Hydrophobe Agent A employed.

TABLE XV

| Example | % Hydrophobicity (Dry Filler) | Plasticity (uncured) (millimeters) | Tensile Strength (MPa) | Modulus At 100% Elongation (MPa) | Elongation At Break (%) |
|---|---|---|---|---|---|
| 61 | 100 | 6.55 | 9.72 | 2.69 | 550 |
| 62 | 100 | 6.07 | 11.51 | 2.59 | 605 |
| 63 | 100 | 7.54 | 9.03 | 4.07 | 455 |
| 64 | 100 | 4.95 | 4.62 | 2.59 | 355 |
| 65 | 100 | 5.94 | 9.20 | 2.24 | 570 |
| 66 | 100 | 7.24 | 12.27 | 2.65 | 635 |
| 67 | 100 | 5.44 | 10.17 | 1.52 | 665 |
| 68 | 100 | 6.22 | 10.51 | 3.65 | 580 |

EXAMPLES 69–71

These examples demonstrate the use of other types of alkyl silicates in producing hydrophobic reinforcing silica fillers. Example 69 was prepared using a methyl polysilicate described as a mixture of methyl esters of polysilicic acid having a number average molecular weight of about 360–470, a viscosity of 7 to 8 kilopascal·seconds at 20° C., an SiO$_2$ content of about 50% and a density of 1.140–1.160 at 20° C. (sold under the tradename "Dynasil 51" by Dynamit Nobel Chemicals). Example 70 was prepared using an ethyl polysilicate having a viscosity of 3.9 kilopascal·seconds, a density of 1.055–1.065, a number average molecular weight of about 650 and a theoretical SiO$_2$ content of about 40% (sold under the tradename "Ethyl Silicate 40" by the Union Carbide Corporation, New York, N.Y. 10017). Example 71 was prepared using ethyl orthosilicate. The filler produced in Example 69 was prepared according to the procedure used in Example 6 using the following reactants: 149.9 ml of methanol, 26.0 ml of water, 108.0 ml of NH$_3$/methanol solution, 15.8 g of Hydrophobe Agent A and 39.5 ml of the above-described methyl polysilicate. The filler produced in Example 70 was prepared according to the procedure used in Example 52 using the following reactants: 38.3 ml of methanol, 8.2 ml of water, 77.6 ml of NH$_3$/methanol solution, 26.8 ml of Sol'n A and 39.5 ml of the above-described ethyl polysilicate. The filler of Example 71 was prepared according to the procedure used in Example 6 using the following reactants: 108.8 ml of methanol, 6.2 ml of water, 15.7 ml of concentrated aqueous ammonium hydroxide, 10 g of Hydrophobe Agent A and 45 ml of ethyl orthosilicate. The resulting silica-filler containing compositions of Examples 69, 70, and 71 contained a theoretical SiO$_2$ content of 7.4 g, 11.1 g and 7.6 g, respectively of SiO$_2$ per 100 grams of hydrolysis mixture (exclusive of the amount of hydrophobe agent added in each case) and an actual filler solids content of 11.4%, 20.3% and 14.1%, respectively.

The procedures used in preparing elastomer formulations from the silica fillers produced in Examples 69–71 were the same as those used in Examples 4–6. However, in Examples 69 and 70, 60 parts of filler solids per 100 parts of Gum A was used and in Example 71, 54 parts of filler solids per 100 parts of Gum A was used. The average physical properties of the silicone rubbers obtained after using Cure Procedure A and Post-Cure Procedure B are reported in Table XVI.

TABLE XVI

| Example | Tensile Strength (MPa) | Modulus At 100% Elongation (MPa) | Elongation At Break (%) | Tear Die B (kN/m) | Durometer (Shore A) |
|---|---|---|---|---|---|
| 69 | 11.10 | 2.34 | 590 | 30.3 | NA |
| 70 | 7.15 | 1.79 | 510 | 16.1 | 59 |
| 71 | 9.65 | 1.65 | 570 | 15.2 | 60 |

NA - Not Available

EXAMPLES 72–73

This example demonstrates the use of higher levels of hydrophobe agents. The silica filler of Example 72 was prepared according to the procedure used in Example 7 using the following formulation: 205.0 ml methanol, 31.4 ml concentrated aqueous ammonium hydroxide, 17.4 ml water, 50 ml of hexamethyldisilazane and 60 ml of methyl orthosilicate. This filler formulation initially contained 0.59 moles of hexamethyldisilazane per mole of theoretical SiO$_2$ units in the formulation and the total carbon content of the oven-dried filler (washed with water prior to drying) was 12.95%. The elastomer formulation was prepared according to the procedure used in Examples 4–6, but a filler level of 60 parts of filler solids per 100 parts of Gum A was used. Cure Procedure A and Post-Cure Procedure B were used and the following average physical properties of the silicone rubbers were obtained: tensile strength-11.55 MPa, modulus at 100% elongation-1.48 MPa, elongation at break-465% and durometer (Shore A)-53.

Example 73 was prepared using the following formulation: 205 ml methanol, 34.6 ml concentrated aqueous ammonium hydroxide, 15.4 ml water, 40 ml hexamethyldisilazane and 60 ml methyl orthosilicate. The formulation contained a lower initial level of hydrophobe agent (0.48 moles of hydrophobe agent per mole of theoretical SiO₂ units) than did Example 72. The silica filler obtained contained a total carbon content of 11.5% and resulted in a silicone rubber having the following average physical properties: tensile strength-13.65 MPa, modulus at 100% elongation-1.65 MPa, elongation at break-475% and durometer (Shore A)-57. In these examples, it is believed that the excess amount of hydrophobe agent initially present was lost during the devolatization and curing procedures. The greater amount of hydrophobe agent present in Example 72 did appear to affect the physical properties of the silicone rubber, but not to a great extent. The use of more than 0.5 mole percent of hexamethyldisilazane in these examples appears to be wasteful.

That which is claimed is:

1. A method for the production of a composition containing a reinforcing silica filler for silicone rubber which comprises the steps of
   (I) mixing the following in the presence of a sufficient amount of at least one basic catalyst to render the mixture alkaline:
   (A) at least one alkyl silicate selected from the group consisting of methyl orthosilicate, ethyl orthosilicate, methyl polysilicate and ethyl polysilicate wherein said alkyl silicate contains alkoxy radicals,
   (B) an amount of water equal to at least 70 percent of one-half of the stoichiometric amount of water required to completely hydrolyze the alkoxy radicals present in said alkyl silicate,
   (C) at least one alcohol selected from the group consisting of methanol, ethanol, n-propanol and isopropanol, and
   (D) at least one hydrophobe agent selected from the group consisting of $R_nSiZ_{4-n}$, $(R_3Si)_2NH$, $(R_3Si)_2O$, $(R_2SiO)_x$, $(R_2SiNH)_x$, $R'O(R_2SiO)_yR'$, $(R_3Si)_2NR''$ and $(R_2SiNR'')_x$ wherein each R is selected from the group consisting of aliphatic hydrocarbon radicals of from 1 to 6 inclusive carbon atoms, halogenated alkyl radicals of 1 to 10 inclusive carbon atoms and phenyl radicals, each R' is hydrogen or R'', each R'' is an alkyl radical of 1 to 4 inclusive carbon atoms, each Z is —OR', —NHR'', or —NR₂'', n has an average value of from 2 to 3 inclusive, x has an average value of from 3 to 6 inclusive, y has an average value of from 1 to 12 inclusive, the amount of said hydrophobe agent present being sufficient to provide at least 0.05 moles of hydrophobe agent per mole of theoretical SiO₂ units present in said alkyl silicate,
wherein there is a sufficient amount of (A) present to provide at least 3 parts by weight of theoretical SiO₂ units per 100 parts by weight of (A), (B), (C) and any basic catalyst not derived from (D) and wherein the order of mixing is such that (D) is added prior to the occurrence of any gelation of the composition formed upon mixing, and
   (II) aging the mixture formed in (I) for a sufficient amount of time to result in a composition containing a hydrophobic reinforcing silica filler for silicone rubber.

2. The method as claimed in claim 1 wherein (A) is ethyl orthosilicate.

3. The method as claimed in claim 1 wherein (A) is methyl polysilicate or ethyl polysilicate and the average molecular weight of said (A) is less than 1,000 grams per mole.

4. The method as claimed in claim 1 wherein the amount of (A) present is sufficient to provide a range of from 3 to 20 parts by weight of theoretical SiO₂ units per 100 parts by weight of (A), (B), (C) and any basic catalyst not derived from (D).

5. The method as claimed in claim 4 wherein the amount of (A) present is sufficient to provide a range of from 8 to 17 parts by weight of theoretical SiO₂ units per 100 parts by weight of (A), (B), (C) and any basic catalyst not derived from (D).

6. The method as claimed in claim 5 wherein (C) is methanol.

7. The method as claimed in claim 6 wherein (D) is selected from the group consisting of $\{(CH_3)_3Si\}_2NH$, $(CH_3)RSi(OCH_3)_2$, $\{(CH_3)RSiO\}_x$, $R'O\{(CH_3)RSiO\}_yR'$, $\{(CF_cCH_2CH_2)(CH_3)_2Si\}_2NH$, $\{(CF_3CH_2CH_2)(CH_3)SiO\}_x$, $R'O\{(CF_3CH_2CH_2)(CH_3)SiO\}_yR'$ and mixtures of the same where x has an average value of 3 and R is a methyl radical or a vinyl radical.

8. The method as claimed in claim 7 wherein the basic catalyst is ammonia or aqueous ammonium hydroxide.

9. The method as claimed in claim 1 wherein (A) is methyl orthosilicate.

10. The method as claimed in claim 9 wherein the amount of (A) present is sufficient to provide a range of from 3 to 20 parts by weight of theoretical SiO₂ units per 100 parts by weight of (A), (B), (C) and any basic catalyst not derived from (D).

11. The method as claimed in claim 10 wherein the amount of (A) present is sufficient to provide a range of from 8 to 17 parts by weight of theoretical SiO₂ units per 100 parts by weight of (A), (B), (C) and any basic catalyst not derived from (D).

12. The method as claimed in claim 11 wherein (C) is methanol.

13. The method as claimed in claim 12 wherein (D) is selected from the group consisting of $\{(CH_3)_3Si\}_2NH$, $(CH_3)RSi(OCH_3)_2$, $\{(CH_3)RSiO\}_x$, $R'O\{(CH_3)RSiO\}_yR'$, $\{(CF_3CH_2CH_2)(CH_3)_2Si\}_2NH$, $\{(CF_3CH_2CH_2)(CH_3)SiO\}_x$, $R'O\{(CF_3CH_2CH_2)(CH_3)SiO\}_yR'$ and mixtures of the same where x has an average value of 3 and R is a methyl radical or a vinyl radical.

14. The method as claimed in claim 13 wherein the basic catalyst is ammonia or aqueous ammonium hydroxide.

15. The method as claimed in claims 1, 8, or 14 wherein in step (I), the order of mixing comprises the steps of
   (1) mixing (B), (C) and any basic catalyst not provided by (D) together,
   (2) adding (D) to the mixture of step (1) to form a solution, and
   (3) mixing (A) with the solution of step (2) to form a mixture.

16. The method as claimed in claims 1, 8, or 14 wherein in step (I), the order of mixing comprises the steps of
   (1) mixing (B), (C) and any basic catalyst not provided by (D) together to form a solution, and
   (2) adding a solution composed of (A) and (D) to the solution of step (1) to form a mixture.

17. The method as claimed in claims 1 or 9 wherein the amount of (A) present is sufficient to provide a range of from 3 to 10 parts by weight of theoretical $SiO_2$ units per 100 parts by weight of (A), (B), (C) and any basic catalyst not derived from (D) and wherein in step (I), the order of mixing comprises the steps of
(1) mixing (B), (C) and at least one basic catalyst together to form a solution,
(2) adding (A) to the solution of step (1) to form a hydrolysis mixture and
(3) mixing (D) with the hydrolysis mixture prior to the occurrence of any gelation of the hydrolysis mixture to form a mixture.

18. The method as claimed in claim 17 wherein in step (2), the addition of the total amount of (A) is accomplished by means of at least two separate portions, the addition of each portion being separated by a sufficient period of time to allow the development of some silica structure prior to the addition of the next portion of (A), the sum total of said portions being equal to the total amount of (A).

19. The method as claimed in claims 1, 8 or 14 wherein the amount of (B) present is greater than 120 percent of one-half of said stoichiometric amount.

20. The method as claimed in claim 1, 8 or 14 wherein the mixing and aging steps are carried out at room temperature and no external source of heating is employed during the execution of such steps.

21. The method as claimed in claim 20 wherein (D) has an average formula $R'O(R_2SiO)_yR'$.

22. The method as claimed in claim 1 which additionally includes the step (III) of removing the volatile portion of said composition to obtain a dry hydrophobic reinforcing silica filler for silicone rubber.

23. The method as claimed in claim 22 wherein (A) is ethyl orthosilicate.

24. The method as claimed in claim 22 wherein (A) is methyl polysilicate or ethyl polysilicate and the average molecular weight of said (A) is less than 1,000 grams per mole.

25. The method as claimed in claim 22 wherein the amount of (A) present is sufficient to provide a range of from 3 to 20 parts by weight of theoretical $SiO_2$ units per 100 parts by weight of (A), (B), (C) and any basic catalyst not derived from (D).

26. The method as claimed in claim 25 wherein the amount of (A) present is sufficient to provide a range of from 8 to 17 parts by weight of theoretical $SiO_2$ units per 100 parts by weight of (A), (B), (C) and any basic catalyst not derived from (D).

27. The method as claimed in claim 26 wherein (C) is methanol.

28. The method as claimed in claim 27 wherein (D) is selected from the group consisting of $\{(CH_3)_3Si\}_2NH$, $(CH_3)RSi(OCH_3)_2$, $\{(CH_3)RSiO\}_x$, $R'O\{(CH_3)RSiO\}_yR'$, $\{(CF_3CH_2CH_2)(CH_3)_2Si\}_2NH$, $\{(CF_3CH_2CH_2)(CH_3)SiO\}_x$, $R'O\{(CF_3CH_2CH_2)(CH_3)SiO\}_yR'$ and mixtures of the same where x has an average value of 3 and R is a methyl radical or a vinyl radical.

29. The method as claimed in claim 28 wherein the basic catalyst is ammonia or aqueous ammonium hydroxide.

30. The method as claimed in claim 22 wherein (A) is methyl orthosilicate.

31. The method as claimed in claim 30 wherein the amount of (A) present is sufficient to provide a range of from 3 to 20 parts by weight of theoretical $SiO_2$ units per 100 parts by weight of (A), (B), (C) and any basic catalyst not derived from (D).

32. The method as claimed in claim 31 wherein the amount of (A) present is sufficient to provide a range of from 8 to 17 parts by weight of theoretical $SiO_2$ units per 100 parts by weight of (A), (B), (C) and any basic catalyst not derived from (D).

33. The method as claimed in claim 32 wherein (C) is methanol.

34. The method as claimed in claim 33 wherein (D) is selected from the group consisting of $\{(CH_3)_3Si\}_2NH$, $(CH_3)RSi(OCH_3)_2$, $\{(CH_3)RSiO\}_x$, $R'O\{(CH_3)RSiO\}_yR'$, $\{(CF_3CH_2CH_2)(CH_3)_2Si\}_2NH$, $\{(CF_3CH_2CH_2)(CH_3)SiO\}_x$, $R'O\{(CF_3CH_2CH_2)(CH_3)SiO\}_yR'$ and mixtures of the same where x has an average value of 3 and R is a methyl radical or a vinyl radical.

35. The method as claimed in claim 34 wherein the basic catalyst is ammonia or aqueous ammonium hydroxide.

36. The method as claimed in claim 22, 29 or 35 wherein in step (I), the order of mixing comprises the steps of
(1) mixing (B), (C) and any basic catalyst not provided by (D) together,
(2) adding (D) to the mixture of step (1) to form a solution, and
(3) mixing (A) with the solution of step (2) to form a mixture.

37. The method as claimed in claim 22, 29 or 35 wherein in step (I), the order of mixing comprises the steps of
(1) mixing (B), (C) and any basic catalyst not provided by (D) together to form a solution, and
(2) adding a solution composed of (A) and (D) to the solution of step (1) to form a mixture.

38. The method as claimed in claim 22 or 30 wherein the amount of (A) present is sufficient to provide a range of from 3 to 10 parts by weight of theoretical $SiO_2$ units per 100 parts by weight of (A), (B), (C) and any basic catalyst not derived from (D) and wherein in step (I), the order of mixing comprises the steps of
(1) mixing (B), (C) and at least one basic catalyst together to form a solution,
(2) adding (A) to the solution of step (1) to form a hydrolysis mixture and
(3) mixing (D) with the hydrolysis mixture prior to the occurrence of any gelation of the hydrolysis mixture to form a mixture.

39. The method as claimed in claim 38 wherein in step (2), the addition of the total amount of (A) is accomplished by means of at least two separate portions, the addition of each portion being separated by a sufficient period of time to allow the development of some silica structure prior to the addition to the next portion of (A), the sum total of said portions being equal to the total amount of (A).

40. The method as claimed in claim 22, 29 or 35 wherein the amount of (B) present is greater than 120 percent of one-half of said stoichiometric amount.

41. The method as claimed in claim 22, 29, or 35 wherein the mixing and aging steps are carried out at room temperature and no external source of heating is employed during the execution of such steps.

42. The method as claimed in claim 41 wherein (D) has an average formula $R'O(R_2SiO)_yR'$.

43. A composition containing a hydrophobic reinforcing silica filler for silicone rubber obtained in accordance with the method of claim 1.

44. A composition containing a hydrophobic reinforcing silica filler for silicone rubber obtained in accordance with the method of claim 2.

45. A composition containing a hydrophobic reinforcing silica filler for silicone rubber obtained in accordance with the method of claim 3.

46. A composition containing a hydrophobic reinforcing silica filler for silicone rubber obtained in accordance with the method of claim 4.

47. A composition containing a hydrophobic reinforcing silica filler for silicone rubber obtained in accordance with the method of claim 5.

48. A composition containing a hydrophobic reinforcing silica filler for silicone rubber obtained in accordance with the method of claim 6.

49. A composition containing a hydrophobic reinforcing silica filler for silicone rubber obtained in accordance with the method of claim 7.

50. A composition containing a hydrophobic reinforcing silica filler for silicone rubber obtained in accordance with the method of claim 8.

51. A composition containing a hydrophobic reinforcing silica filler for silicone rubber obtained in accordance with the method of claim 9.

52. A composition containing a hydrophobic reinforcing silica filler for silicone rubber obtained in accordance with the method of claim 10.

53. A composition containing a hydrophobic reinforcing silica filler for silicone rubber obtained in accordance with the method of claim 11.

54. A composition containing a hydrophobic reinforcing silica filler for silicone rubber obtained in accordance with the method of claim 12.

55. A composition containing a hydrophobic reinforcing silica filler for silicone rubber obtained in accordance with the method of claim 13.

56. A composition containing a hydrophobic reinforcing silica filler for silicone rubber obtained in accordance with the method of claim 14.

57. A composition containing a hydrophobic reinforcing silica filler for silicone rubber obtained in accordance with the method of claim 15.

58. A composition containing a hydrophobic reinforcing silica filler for silicone rubber obtained in accordance with the method of claim 16.

59. A composition containing a hydrophobic reinforcing silica filler for silicone rubber obtained in accordance with the method of claim 17.

60. A composition containing a hydrophobic reinforcing silica filler for silicone rubber obtained in accordance with the method of claim 18.

61. A composition containing a hydrophobic reinforcing silica filler for silicone rubber obtained in accordance with the method of claim 19.

62. A composition containing a hydrophobic reinforcing silica filler for silicone rubber obtained in accordance with the method of claim 20.

63. A composition containing a hydrophobic reinforcing silica filler for silicone rubber obtained in accordance with the method of claim 21.

64. A dry hydrophobic reinforcing silica filler for silicone rubber obtained in accordance with the method of claim 22.

65. A dry hydrophobic reinforcing silica filler for silicone rubber obtained in accordance with the method of claim 23.

66. A dry hydrophobic reinforcing silica filler for silicone rubber obtained n accordance with the method of claim 24.

67. A dry hydrophobic reinforcing silica filler for silicone rubber obtained in accordance with the method of claim 25.

68. A dry hydrophobic reinforcing silica filler for silicone rubber obtained in accordance with the method of claim 26.

69. A dry hydrophobic reinforcing silica filler for silicone rubber obtained in accordance with the method of claim 27.

70. A dry hydrophobic reinforcing silica filler for silicone rubber obtained in accordance with the method of claim 28.

71. A dry hydrophobic reinforcing silica filler for silicone rubber obtained in accordance with the method of claim 29.

72. A dry hydrophobic reinforcing silica filler for silicone rubber obtained in accordance with the method of claim 30.

73. A dry hydrophobic reinforcing silica filler for silicone rubber obtained in accordance with the method of claim 31.

74. A dry hydrophobic reinforcing silica filler for silicone rubber obtained in accordance with the method of claim 32.

75. A dry hydrophobic reinforcing silica filler for silicone rubber obtained in accordance with the method of claim 33.

76. A dry hydrophobic reinforcing silica filler for silicone rubber obtained in accordance with the method of claim 34.

77. A dry hydrophobic reinforcing silica filler for silicone rubber obtained in accordance with the method of claim 35.

78. A dry hydrophobic reinforcing silica filler for silicone rubber obtained in accordance with the method of claim 36.

79. A dry hydrophobic reinforcing silica filler for silicone rubber obtained in accordance with the method of claim 37.

80. A dry hydrophobic reinforcing silica filler for silicone rubber obtained in accordance with the method of claim 38.

81. A dry hydrophobic reinforcing silica filler for silicone rubber obtained in accordance with the method of claim 39.

82. A dry hydrophobic reinforcing silica filler for silicone rubber obtained in accordance with the method of claim 40.

83. A dry hydrophobic reinforcing silica filler for silicone rubber obtained in accordance with the method of claim 41.

84. A dry hydrophobic reinforcing silica filler for silicone rubber obtained in accordance with the method of claim 42.

* * * * *

UNITED STATES PATENT AND TRADEMARK OFFICE
CERTIFICATE OF CORRECTION

PATENT NO. : 4,344,800
DATED : August 17, 1982
INVENTOR(S) : MICHAEL A. LUTZ

It is certified that error appears in the above—identified patent and that said Letters Patent is hereby corrected as shown below:

In column 6, line 6, "compartment" should read --component--.

In column 6, line 24, "belived" should read --believed--.

In column 7, line 10, "$(CH_3)_2-Si(NHCH_3)_2$" should read --$(CH_3)_2Si(NHCH_3)_2$--.

In column 9, line 41, "fillers" should read --filler--.

In column 22, line 40, "0.88" should read --0.08--.

In Table IX bridging columns 23 and 24, in the third column of the heading under "Surface Area", the notation "(m hu 2/g)" should read --$m^2/g$--.

In Table XIII bridging columns 27 and 28, in the eighth heading, the first reference to "tear" should be deleted.

UNITED STATES PATENT AND TRADEMARK OFFICE
CERTIFICATE OF CORRECTION

PATENT NO. : 4,344,800

DATED : August 17, 1982

INVENTOR(S) : MICHAEL A. LUTZ

It is certified that error appears in the above—identified patent and that said Letters Patent is hereby corrected as shown below:

In Table XIII bridging columns 27 and 28, the Durometer (Shore A) value reported for Example 59 of "76" should read --79--.

In column 34, line 4 of claim 7, the formula
"$\{(CF_cCH_2CH_2)(CH_3)_2Si\}_2NH$" should read
--$\{(CF_3CH_2CH_2)(CH_3)_2Si\}_2NH$--.

In column 36, line 6 of claim 39, the phrase "to the next portion" should read --of the next portion--.

Signed and Sealed this

Twelfth Day of July 1983

[SEAL]

Attest:

GERALD J. MOSSINGHOFF

Attesting Officer

Commissioner of Patents and Trademarks